(12) United States Patent
Abotabl et al.

(10) Patent No.: US 11,683,351 B2
(45) Date of Patent: Jun. 20, 2023

(54) PROTECTION LEVEL INDICATION AND CONFIGURATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/461,523

(22) Filed: Aug. 30, 2021

(65) Prior Publication Data

US 2023/0060726 A1    Mar. 2, 2023

(51) Int. Cl.
- *H04L 29/06* (2006.01)
- *H04L 9/40* (2022.01)
- *H04W 12/033* (2021.01)
- *H04W 12/10* (2021.01)

(52) U.S. Cl.
CPC ............ *H04L 63/205* (2013.01); *H04L 63/16* (2013.01); *H04W 12/033* (2021.01); *H04W 12/10* (2013.01)

(58) Field of Classification Search
None
See application file for complete search history.

(56) References Cited

U.S. PATENT DOCUMENTS

| | | | | |
|---|---|---|---|---|
| RE48,631 E | * | 7/2021 | Baghel | H04W 8/22 |
| 11,539,818 B2 | * | 12/2022 | Sabella | H04L 67/289 |
| 2018/0013568 A1 | * | 1/2018 | Muhanna | H04L 9/0825 |
| 2018/0083972 A1 | * | 3/2018 | Kim | H04L 41/0853 |
| 2020/0100102 A1 | * | 3/2020 | Xu | H04W 12/033 |
| 2020/0288319 A1 | * | 9/2020 | Pham Van | H04W 74/0833 |
| 2021/0136584 A1 | * | 5/2021 | Byun | H04L 63/205 |
| 2022/0132315 A1 | * | 4/2022 | Kolekar | H04L 63/205 |

(Continued)

FOREIGN PATENT DOCUMENTS

EP    3541105 A1    9/2019

OTHER PUBLICATIONS

Burg, Andreas et al. Wireless Communication and Security Issues for Cyber-Physical Systems and the Internet-of-Things. Proceedings of the IEEE, vol. 106, Issue: 1. https://ieeexplore.ieee.org/stamp/stamp.jsp?tp=&arnumber=8232533 (Year: 2018).*

(Continued)

*Primary Examiner* — Jeremiah L Avery
(74) *Attorney, Agent, or Firm* — Holland & Hart LLP/Qualcomm Incorporated

(57) ABSTRACT

Methods, systems, and devices for wireless communications are described. A base station may transmit, to a user equipment (UE), a control message that includes an identification of a set of protection levels corresponding to different degrees of physical layer security for securing communications between the UE and the base station. The base station may transmit, to the UE, an indication of an identified protection level of the set of protection levels to be used by the UE for securing the communications between the UE and the base station. The UE may communicate with the base station in accordance with the identified protection level.

30 Claims, 16 Drawing Sheets

(56) References Cited

U.S. PATENT DOCUMENTS

2022/0256436 A1* 8/2022 Guo ..................... H04W 40/36
2022/0408445 A1* 12/2022 Sun ..................... H04B 7/0486

OTHER PUBLICATIONS

Wang, Dawei et al. Cross Layer Resource Allocation Design for Uplink Video OFDMA Wireless Systems. 2011 IEEE Global Telecommunications Conference—GLOBECOM 2011. https://ieeexplore.ieee.org/stamp/stamp.jsp?tp=&arnumber=6134147 (Year: 2011).*
Sun, Li; Du, Qinghe. Physical layer security with its applications in 5G networks: A review. China Communications, vol. 14, Issue: 12. https://ieeexplore.ieee.org/stamp/stamp.jsp?tp=&arnumber=8246328 (Year: 2017).*
International Search Report and Written Opinion—PCT/US2022/038936—ISA/EPO—dated Oct. 24, 2022.
Thales: "pCR for Adding a Solution for Key Issue #1.13: Security Implications of Low Latency", 3GPP TSG SA WG3 (Security) Adhoc Meeting on FS_NSA, S3-161493 Was S3-161414-PCR to 33 899, 3rd Generation Partnership Project, Mobile Competence Centre, 650, Route Des Lucioles, F-06921 Sophia-Antipolis Cedex, France, vol. SA WG3, No. San Diego, USA, Sep. 27, 2016-Sep. 29, 2016, Oct. 5, 2016, 2 Pages, XP051170441, p. 2, lines 7-12.

* cited by examiner

PROTECTION LEVEL INDICATION AND CONFIGURATION

FIELD OF TECHNOLOGY

The following relates to wireless communications, including protection level indication and configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support protection level indication and configuration. Generally, the described techniques provide for a user equipment (UE) to determine whether to provide physical layer security for a transmission based on a corresponding protection level. For instance, a base station may transmit, to a UE, a control message that includes an identification of a set of protection levels corresponding to different degrees of physical layer security for securing communications between the UE and the base station. The base station may transmit, to the UE, an indication of an identified protection level of the set of protection levels to be used by the UE for securing the communications between the UE and the base station. The UE may communicate with the base station in accordance with the identified protection level.

A method for wireless communication at a user equipment (UE) is described. The method may include receiving, from a base station, a control message that includes an identification of a set of multiple protection levels corresponding to different degrees of physical layer security for securing communications between the UE and the base station, receiving, from the base station, an indication of an identified protection level of the set of multiple protection levels to be used by the UE for securing the communications between the UE and the base station, and communicating with the base station in accordance with the identified protection level.

An apparatus for wireless communication at a UE is described. The apparatus may include a processor, memory coupled with the processor, and instructions stored in the memory. The instructions may be executable by the processor to cause the apparatus to receive, from a base station, a control message that includes an identification of a set of multiple protection levels corresponding to different degrees of physical layer security for securing communications between the UE and the base station, receive, from the base station, an indication of an identified protection level of the set of multiple protection levels to be used by the UE for securing the communications between the UE and the base station, and communicate with the base station in accordance with the identified protection level.

Another apparatus for wireless communication at a UE is described. The apparatus may include means for receiving, from a base station, a control message that includes an identification of a set of multiple protection levels corresponding to different degrees of physical layer security for securing communications between the UE and the base station, means for receiving, from the base station, an indication of an identified protection level of the set of multiple protection levels to be used by the UE for securing the communications between the UE and the base station, and means for communicating with the base station in accordance with the identified protection level.

A non-transitory computer-readable medium storing code for wireless communication at a UE is described. The code may include instructions executable by a processor to receive, from a base station, a control message that includes an identification of a set of multiple protection levels corresponding to different degrees of physical layer security for securing communications between the UE and the base station, receive, from the base station, an indication of an identified protection level of the set of multiple protection levels to be used by the UE for securing the communications between the UE and the base station, and communicate with the base station in accordance with the identified protection level.

Some examples of the method, apparatuses, and non-transitory computer-readable medium described herein may further include operations, features, means, or instructions for receiving a mapping of each protection level of the set of multiple protection levels to a respective one or more channels, where the different degrees of physical layer security relate to a number of any type of channels to which the physical layer security may be applied.

In some examples of the method, apparatuses, and non-transitory computer-readable medium described herein, the one or more channels include an uplink control channel, a downlink shared channel, an uplink shared channel, a downlink control channel, or any combination thereof and each channel of the one or more channels may be associated with a different protection level of the set of multiple protection levels.

In some examples of the method, apparatuses, and non-transitory computer-readable medium described herein, a first protection level of the set of multiple protection levels and a second protection level of the set of multiple protection levels each map to a same channel.

In some examples of the method, apparatuses, and non-transitory computer-readable medium described herein, a first protection level of the plurality of protection levels provides physical layer security to a physical uplink control channel and a second protection level of the plurality of protection levels provides physical layer security to the physical uplink control channel and a physical uplink shared channel.

Some examples of the method, apparatuses, and non-transitory computer-readable medium described herein may further include operations, features, means, or instructions for transmitting, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

Some examples of the method, apparatuses, and non-transitory computer-readable medium described herein may further include operations, features, means, or instructions for applying the identified protection level to the communications with the base station until the UE receives a second control message indicating to change to applying another protection level of the set of multiple protection levels and receiving the second control message.

Some examples of the method, apparatuses, and non-transitory computer-readable medium described herein may further include operations, features, means, or instructions for transmitting, during a duration overlapping with communicating with the base station, an interference signal based on receiving the indication of the identified protection level.

In some examples of the method, apparatuses, and non-transitory computer-readable medium described herein, receiving the control message may include operations, features, means, or instructions for receiving radio resource control (RRC) signaling including the identification of the set of multiple protection levels.

In some examples of the method, apparatuses, and non-transitory computer-readable medium described herein, receiving the indication of the identified protection level may include operations, features, means, or instructions for receiving downlink control information scheduling the communicating with the base station and including the indication of the identified protection level.

In some examples of the method, apparatuses, and non-transitory computer-readable medium described herein, receiving the indication of the identified protection level may include operations, features, means, or instructions for receiving medium access control (MAC) control element (MAC-CE) signaling or RRC signaling that indicates the identified protection level.

A method for wireless communication at a base station is described. The method may include transmitting, to a UE, a control message that includes an identification of a set of multiple protection levels corresponding to different degrees of physical layer security for securing communications between the UE and the base station, transmitting, to the UE, an indication of an identified protection level of the set of multiple protection levels to be used by the UE for securing the communications between the UE and the base station, and communicating with the UE in accordance with the identified protection level.

An apparatus for wireless communication at a base station is described. The apparatus may include a processor, memory coupled with the processor, and instructions stored in the memory. The instructions may be executable by the processor to cause the apparatus to transmit, to a UE, a control message that includes an identification of a set of multiple protection levels corresponding to different degrees of physical layer security for securing communications between the UE and the base station, transmit, to the UE, an indication of an identified protection level of the set of multiple protection levels to be used by the UE for securing the communications between the UE and the base station, and communicate with the UE in accordance with the identified protection level.

Another apparatus for wireless communication at a base station is described. The apparatus may include means for transmitting, to a UE, a control message that includes an identification of a set of multiple protection levels corresponding to different degrees of physical layer security for securing communications between the UE and the base station, means for transmitting, to the UE, an indication of an identified protection level of the set of multiple protection levels to be used by the UE for securing the communications between the UE and the base station, and means for communicating with the UE in accordance with the identified protection level.

A non-transitory computer-readable medium storing code for wireless communication at a base station is described. The code may include instructions executable by a processor to transmit, to a UE, a control message that includes an identification of a set of multiple protection levels corresponding to different degrees of physical layer security for securing communications between the UE and the base station, transmit, to the UE, an indication of an identified protection level of the set of multiple protection levels to be used by the UE for securing the communications between the UE and the base station, and communicate with the UE in accordance with the identified protection level.

Some examples of the method, apparatuses, and non-transitory computer-readable medium described herein may further include operations, features, means, or instructions for transmitting a mapping of each protection level of the set of multiple protection levels to a respective one or more channels, where the different degrees of physical layer security relate to a number of any type of channels to which the physical layer security may be applied.

In some examples of the method, apparatuses, and non-transitory computer-readable medium described herein, the one or more channels include an uplink control channel, a downlink shared channel, an uplink shared channel, a downlink control channel, or any combination thereof and each channel of the one or more channels may be associated with a different protection level of the set of multiple protection levels.

In some examples of the method, apparatuses, and non-transitory computer-readable medium described herein, a first protection level of the set of multiple protection levels and a second protection level of the set of multiple protection levels each map to a same channel.

In some examples of the method, apparatuses, and non-transitory computer-readable medium described herein, a first protection level of the plurality of protection levels provides physical layer security to a physical uplink control channel and a second protection level of the plurality of protection levels provides physical layer security to the physical uplink control channel and a physical uplink shared channel.

Some examples of the method, apparatuses, and non-transitory computer-readable medium described herein may further include operations, features, means, or instructions for receiving, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

In some examples of the method, apparatuses, and non-transitory computer-readable medium described herein, transmitting the control message may include operations, features, means, or instructions for transmitting RRC signaling including the identification of the set of multiple protection levels.

In some examples of the method, apparatuses, and non-transitory computer-readable medium described herein, transmitting the indication of the identified protection level may include operations, features, means, or instructions for transmitting downlink control information scheduling the communicating with the UE and including the indication of the identified protection level.

In some examples of the method, apparatuses, and non-transitory computer-readable medium described herein, transmitting the indication of the identified protection level may include operations, features, means, or instructions for transmitting medium access control (MAC) control element (MAC-CE) signaling or RRC signaling that indicates the identified protection level.

DETAILED DESCRIPTION

A user equipment (UE) may communicate with a base station. For instance, the UE may transmit a transmission to a base station, which may be referred to as uplink communications, or the base station may transmit a transmission to the UE, which may be referred to as downlink communications. In some examples, a UE may perform one or more techniques to provide physical layer security to a transmission. For instance, if the transmission is a downlink transmission, the UE may transmit a jamming signal to other wireless devices while receiving the downlink transmission. However, the UE performing techniques to provide physical layer security for a transmission may be associated with a greater latency and/or power consumption transmission. Additionally, the UE refraining from performing the techniques to provide physical layer security for a transmission may increase a likelihood that wireless devices besides the UE and/or the base station may intercept and successfully decode the transmission.

The techniques described herein describe methods that enable a UE to determine a protection level (e.g., security level, secrecy level) for a communication channel (e.g., physical downlink shared channel (PDSCH), physical downlink control channel (PDCCH), physical uplink shared channel (PUSCH), physical uplink control channel (PUCCH)) and to determine whether to apply and/or what type of physical layer security to provide to a transmission on that communication channel. For instance, the UE may receive, from the base station, a control message that includes an identification of a set of protection levels corresponding to different degrees of physical layer security for securing communications between the UE and the base station. The UE may receive, from the base station, an indication of an identified protection level of the set of protection levels to be used for securing communications between the UE and the base station and the UE may communicate with the base station in accordance with the identified protection level. Enabling the UE to determine the protection level in this manner may enable the UE to reduce latency and/or power consumption for transmissions on communication channels associated with reduced protection levels and may enable the UE to provide physical layer security for transmissions on communication channels associated with increased protection levels.

Aspects of the disclosure are initially described in the context of wireless communications systems. Additional aspects of the disclosure are described in the context of a process flow. Aspects of the disclosure are further illustrated by and described with reference to apparatus diagrams, system diagrams, and flowcharts that relate to protection level indication and configuration.

Figure 1:
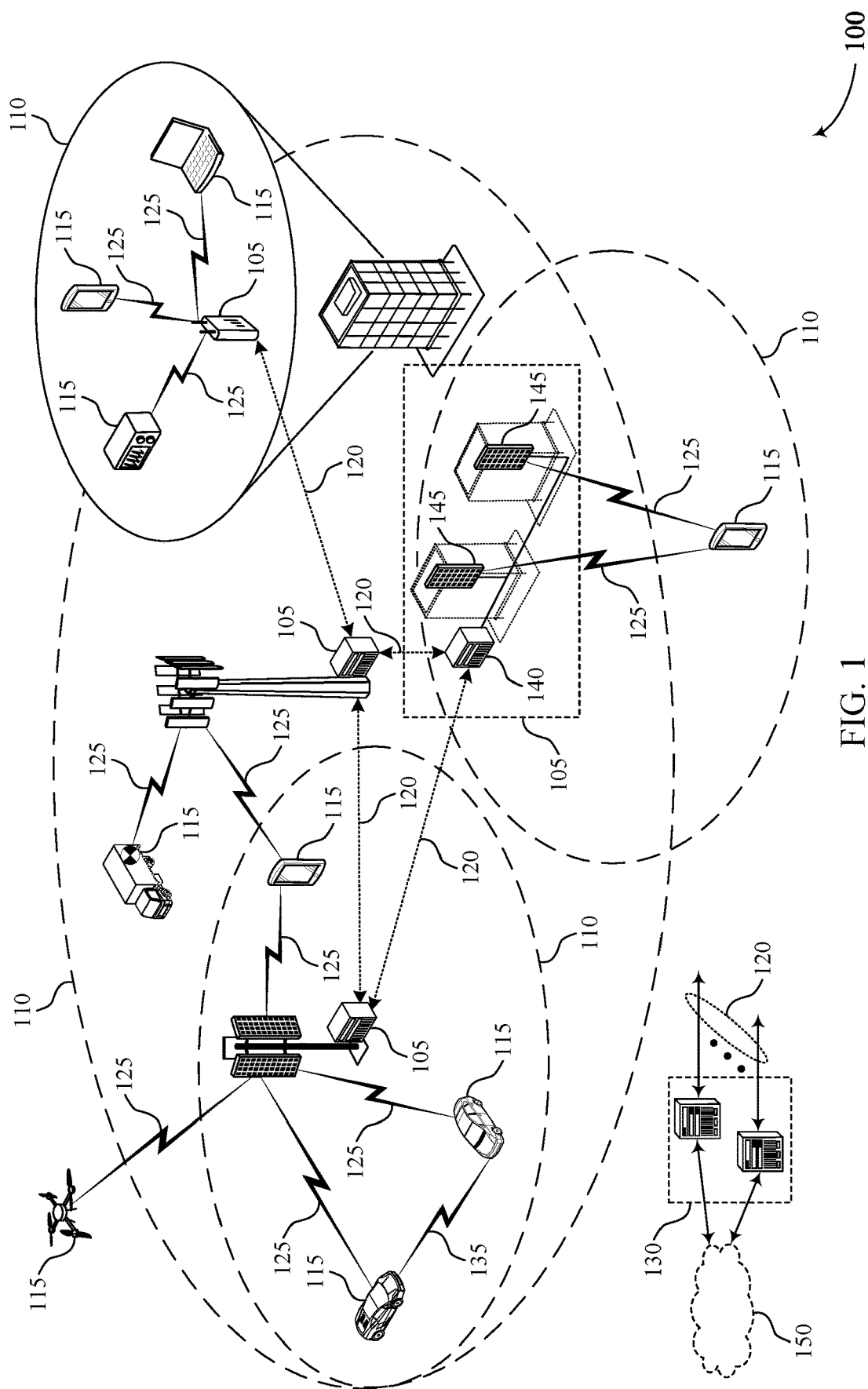
FIG. 1 illustrates an example of a wireless communications system that supports protection level indication and configuration in accordance with aspects of the present disclosure.

FIG. 1 illustrates an example of a wireless communications system 100 that supports protection level indication and configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may perform one or more techniques to provide physical layer security to a transmission. For instance, if the transmission is a downlink transmission, the UE 115 may transmit a jamming signal to other wireless devices (e.g., other UEs 115) while receiving the downlink transmission. However, the UE 115 performing techniques to provide physical layer security for a transmission may be associated with a greater latency and/or power consumption transmission. Additionally, the UE 115 refraining from performing the techniques to provide physical layer security for a transmission may increase a likelihood that wireless devices besides the UE 115 and/or the base station 105 may intercept and successfully decode the transmission.

The techniques described herein describe methods that enable a UE 115 to determine a protection level (e.g., security level, secrecy level) for a communication channel (e.g., physical downlink shared channel (PDSCH), physical downlink control channel (PDCCH), physical uplink shared channel (PUSCH), physical uplink control channel (PUCCH)) and to determine whether to apply and/or what type of physical layer security to provide to a transmission on that communication channel. For instance, the UE 115 may receive, from the base station 105, a control message that includes an identification of a set of protection levels corresponding to different degrees of physical layer security for securing communications between the UE 115 and the base station 105. The UE 115 may receive, from the base station 105, an indication of an identified protection level of the set of protection levels to be used for securing communications between the UE 115 and the base station 105 and the UE 115 may communicate with the base station 115 in accordance with the identified protection level. Enabling the UE 115 to determine the protection level in this manner may enable the UE 115 to reduce latency and/or power consumption for transmissions on communication channels associated with reduced protection levels and may enable the UE 115 to provide physical layer security for transmissions on communication channels associated with increased protection levels.

In some examples, providing physical layer security may include the UE 115 or the base station 105 filling a capacity of an eavesdropping wireless device with interference (e.g., garbage) such that the wireless device receives zero information from the UE 115 or the base station 105. The interference (e.g., garbage) may be in the form of randomness that the UE 115 sends (e.g., via an interference or jamming signal) with a code rate filling the capacity of the eavesdropping wireless device such that the wireless device fails in detecting at least some of the information being provided by the UE 115 or the base station 105. In some examples, providing physical layer security may involve performing a physical layer procedure that exploits the statistics of a channel to hide information (e.g., instead of using keys, such as when performing encryption). The result of encryption may, in some examples, be more likely to be overcome by an eavesdropping wireless device than the result of the physical layer procedure. Additionally, encryption may include more processing in higher layers and may be associated with higher latency than the physical layer procedure.

In some examples, the UE 115 and/or the base station 105 may perform in a full-duplex mode. If the UE 115 and/or the base station 105 perform in an in-band full-duplex (IBFD) mode, the resources for uplink transmissions and the resources for downlink transmissions may overlap at least partially. However, if the UE 115 and/or the base station 105 perform in a side-band full-duplex (SBFD) mode, the resources for uplink transmissions and the resources for downlink transmissions may be separated in frequency by a guard band. In some examples, a full-duplex UE may be capable of receiving information and transmitting a jamming signal simultaneously.

Figure 2:
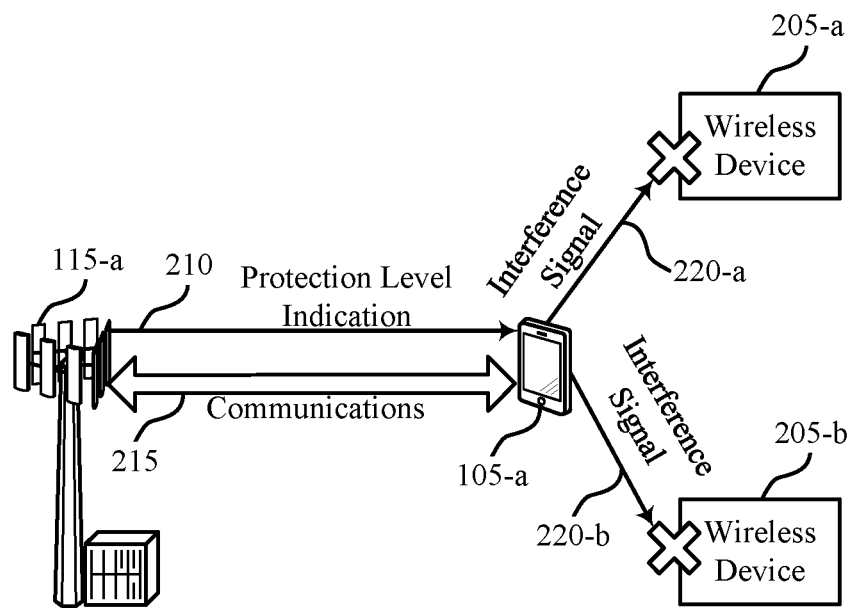
FIG. 2 illustrates an example of a wireless communications system that supports protection level indication and configuration in accordance with aspects of the present disclosure.

FIG. 2 illustrates an example of a wireless communications system 200 that supports protection level indication and configuration in accordance with aspects of the present disclosure. In some examples, wireless communications system 200 may be implemented by one or more features of wireless communications system 100. For instance, base station 105-a may be an example of a base station 105 as described with reference to FIG. 1 and UE 115-a may be an example of a UE 115 as described with reference to FIG. 1. Additionally or alternatively, wireless devices 205-a and 205-b may each be an example of a UE 115 or a base station 105 as described with reference to FIG. 1.

As described herein, base station 105-a may transmit, to UE 115-a, a control message that includes an identification of a set of protection levels (e.g., secrecy levels, security levels) corresponding to different degrees of physical layer security for securing communications between UE 115-a and base station 105-a. For instance, UE 115-a may be configured with multiple levels of protection levels. In some examples, a radio resource control (RRC) configuration may indicate, to UE 115-a, how many levels of protection that UE 115-a is to consider.

In some examples, base station 105-a may transmit, to UE 115-a, an indication 210 of an identified protection level of the set of protection levels that UE 115-a is to use for securing the communications between UE 115-a and base station 105-a. For instance, in scheduling downlink control information (DCI), base station 105-a may include one or more bits to indicate the protection level of the scheduled transmission. In some examples, UE 115-a may be configured with the identified protection level until signaled to change the protection level. In some examples, the protection level may be signaled via medium access control (MAC) control element (MAC-CE) signaling or RRC signaling.

UE 115-a may apply the identified protection level to each channel of a set of channels or to each channel of a subset of the set of channels. The set of channels to apply the protection level to may be RRC configured for each protection level (e.g., base station 105-a may provide a mapping from a protection level to one or more channels). For instance, protection level 1 may map to PUCCH and protection level 2 may map to PUCCH and PUSCH.

In some examples, base station 105-a may communicate with UE 115-a in accordance with the identified protection level (e.g., communications 215 may occur between UE 115-a and base station 105-a). While communicating with base station 105-a in accordance with the identified protection level, UE 115-a may transmit an interference signal 220-a (e.g., a jamming signal) to wireless device 205-a and an interference signal 220-b (e.g., the same jamming signal or another jamming signal) to wireless device 205-b.

The methods described herein may be associated with one or more advantages. For instance, the methods described herein may support techniques for UE 115-a to identify which protection level to use when performing communications over a particular channel or for a particular frequency. Accordingly, UE 115-a may selectively secure communications between UE 115-a and base station 105-a, which may enable UE 115-a to transmit an interference (e.g., jamming) signal (e.g., thus providing security for communications between the device 405 and a base station) when directed or to refrain from transmitting the interference signal (e.g., thus saving energy or resources for other transmissions).

Figure 3:
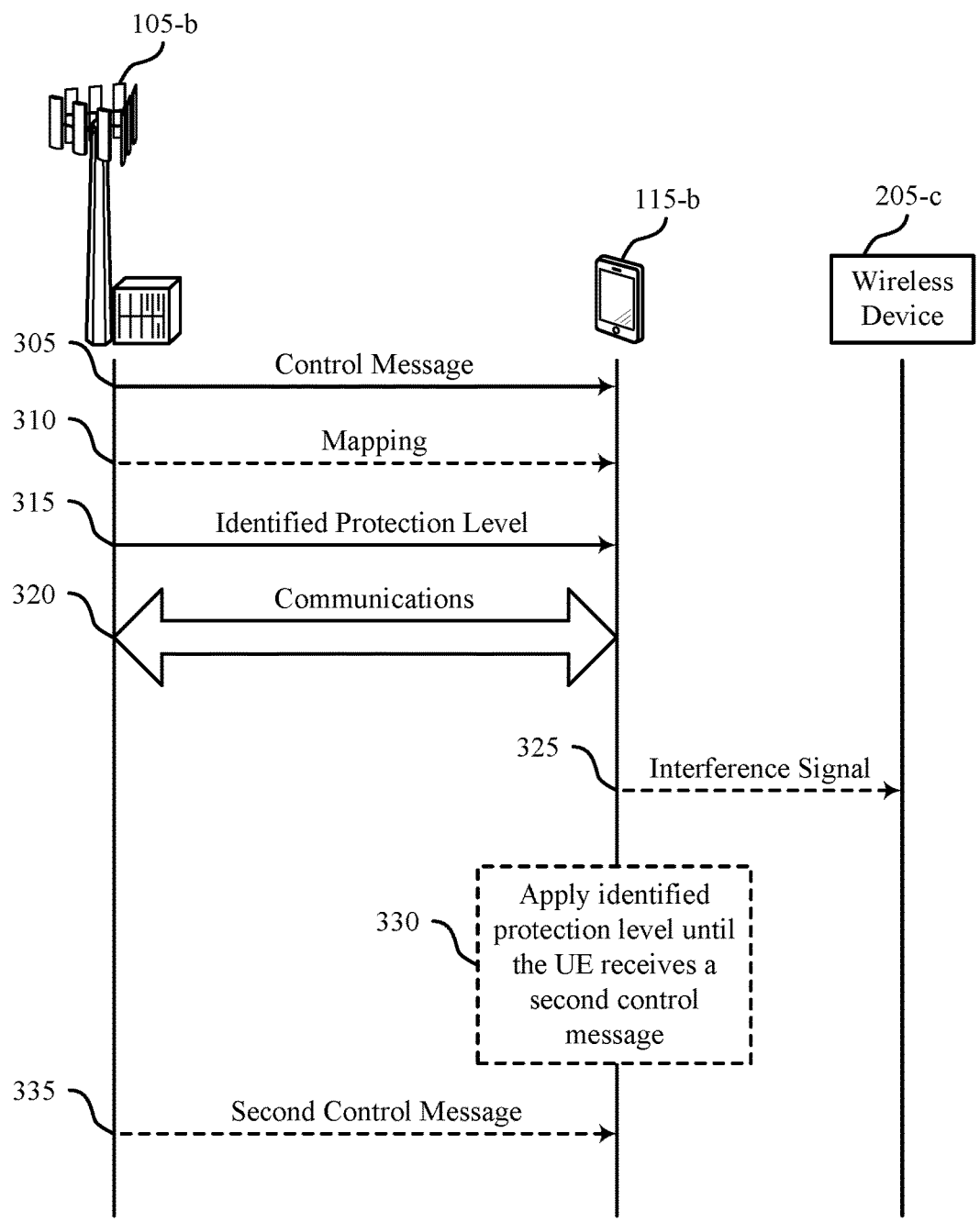
FIG. 3 illustrates an example of a process flow that supports protection level indication and configuration in accordance with aspects of the present disclosure.

FIG. 3 illustrates an example of a process flow 300 that supports protection level indication and configuration in accordance with aspects of the present disclosure. In some examples, process flow 300 may be implemented by one or more aspects of wireless communications systems 100 and/or 200. For instance, base station 105-b may be an example of a base station 105-a as described with reference to FIG. 2 and/or a base station 105 as described with reference to FIG. 1; UE 115-b may be an example of a UE 115-a as described with reference to FIG. 2 and/or a UE 115 as described with reference to FIG. 1; and wireless device 205-c may be an example of a wireless device 205-a or 205-b as described with reference to FIG. 2.

At 305, base station 105-a may transmit, to UE 115-a, a control message that includes an identification of a set of protection levels corresponding to different degrees of physical layer security for securing communications between UE 115-a and base station 105-a. In some examples, the set of protection levels may be conveyed via radio resource control (RRC) signaling.

At 310, base station 105-a may transmit, to UE 115-a, a mapping of each protection level of the set of protection levels to a respective one or more channels, where the different degrees of physical layer security relate to a number of any type of channels to which the physical layer security is applied. In some examples, the one or more channels may include an uplink control channel (e.g., PUCCH), a downlink shared channel (e.g., PDSCH), an uplink shared channel (e.g., PUSCH), a downlink control channel (e.g., PDSCH), or any combination thereof. Additionally or alternatively, each channel of the one or more channels may be associated with a different protection level of the set of protection levels. In some examples, the first protection level of the set of protection levels and a second protection level of the set of protection levels may map to a same channel.

At 315, base station 105-a may transmit to UE 115-a, an indication of an identified protection level of the set of protection levels to be used by the UE for securing the communications between UE 115-a and base station 105-a. In some examples, the indication of the identified protection level may be indicated via RRC signaling, MAC-CE signaling, or DCI signaling.

At 320, UE 115-a may communicate with base station 105-a in accordance with the identified protection level.

At 325, base station 105-a may transmit, to UE 115-a and during a duration overlapping with communicating with base station 105-a (e.g., at 320), an interference signal (e.g., a jamming signal) based on transmitting the indication of the identified protection level.

At 330, UE 115-a my apply the identified protection level to the communications with the base station until UE 115-a receives a second control message indicating to change to applying another protection level of the set of protection levels.

At 335, base station 105-a may transmit the second control message to UE 115-a.

Figure 4:
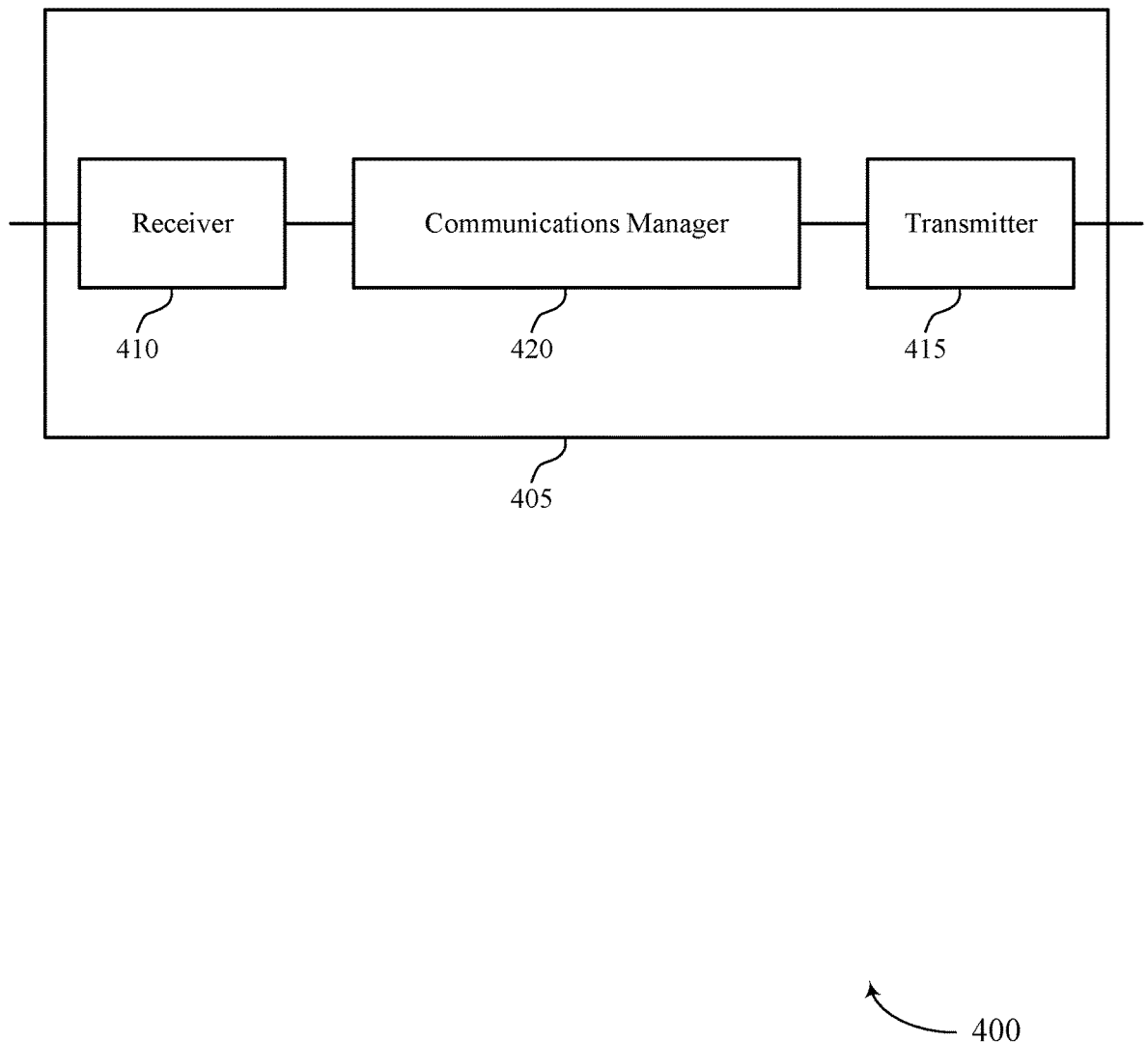
FIGS. 4 and 5 show block diagrams of devices that support protection level indication and configuration in accordance with aspects of the present disclosure.

FIG. 4 shows a block diagram 400 of a device 405 that supports protection level indication and configuration in accordance with aspects of the present disclosure.

The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to protection level indication and configuration). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to protection level indication and configuration). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of protection level indication and configuration as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a control message that includes an identification of a set of multiple protection levels corresponding to different degrees of physical layer security for securing communications between the UE and the base station. The communications manager 420 may be configured as or otherwise support a means for receiving, from the base station, an indication of an identified protection level of the set of multiple protection levels to be used by the UE for securing the communications between the UE and the base station. The communications manager 420 may be configured as or otherwise support a means for communicating with the base station in accordance with the identified protection level.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for the device 405 to identify which protection level to use when performing communications over a particular channel or for a particular frequency. Accordingly, the device 405 may selectively secure communications between the device 405 and the base station, which may enable the device 405 to transmit an interference (e.g., jamming) signal (e.g., thus providing security for communications between the device 405 and a base station) when directed or to refrain from transmitting the interference signal (e.g., thus saving energy or resources for other transmissions).

Figure 5:
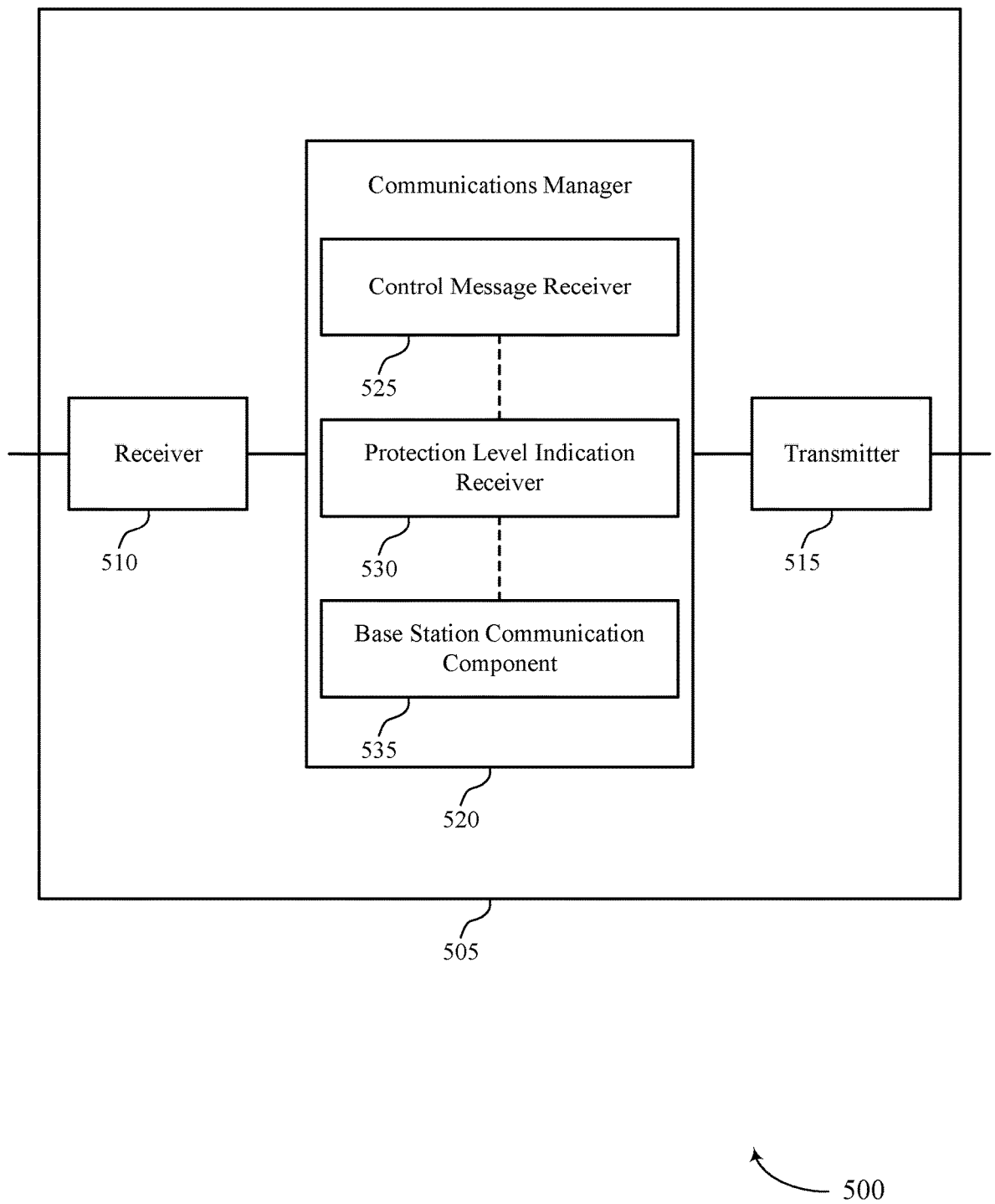

FIG. 5 shows a block diagram 500 of a device 505 that supports protection level indication and configuration in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to protection level indication and configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to protection level indication and configuration). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of protection level indication and configuration as described herein. For example, the communications manager 520 may include a control message receiver 525, a protection level indication receiver 530, a base station communication component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The control message receiver 525 may be configured as or otherwise support a means for receiving, from a base station, a control message that includes an identification of a set of multiple protection levels corresponding to different degrees of physical layer security for securing communications between the UE and the base station. The protection level indication receiver 530 may be configured as or otherwise support a means for receiving, from the base station, an indication of an identified protection level of the set of multiple protection levels to be used by the UE for securing the communications between the UE and the base station. The base station communication component 535 may be configured as or otherwise support a means for communicating with the base station in accordance with the identified protection level.

Figure 6:
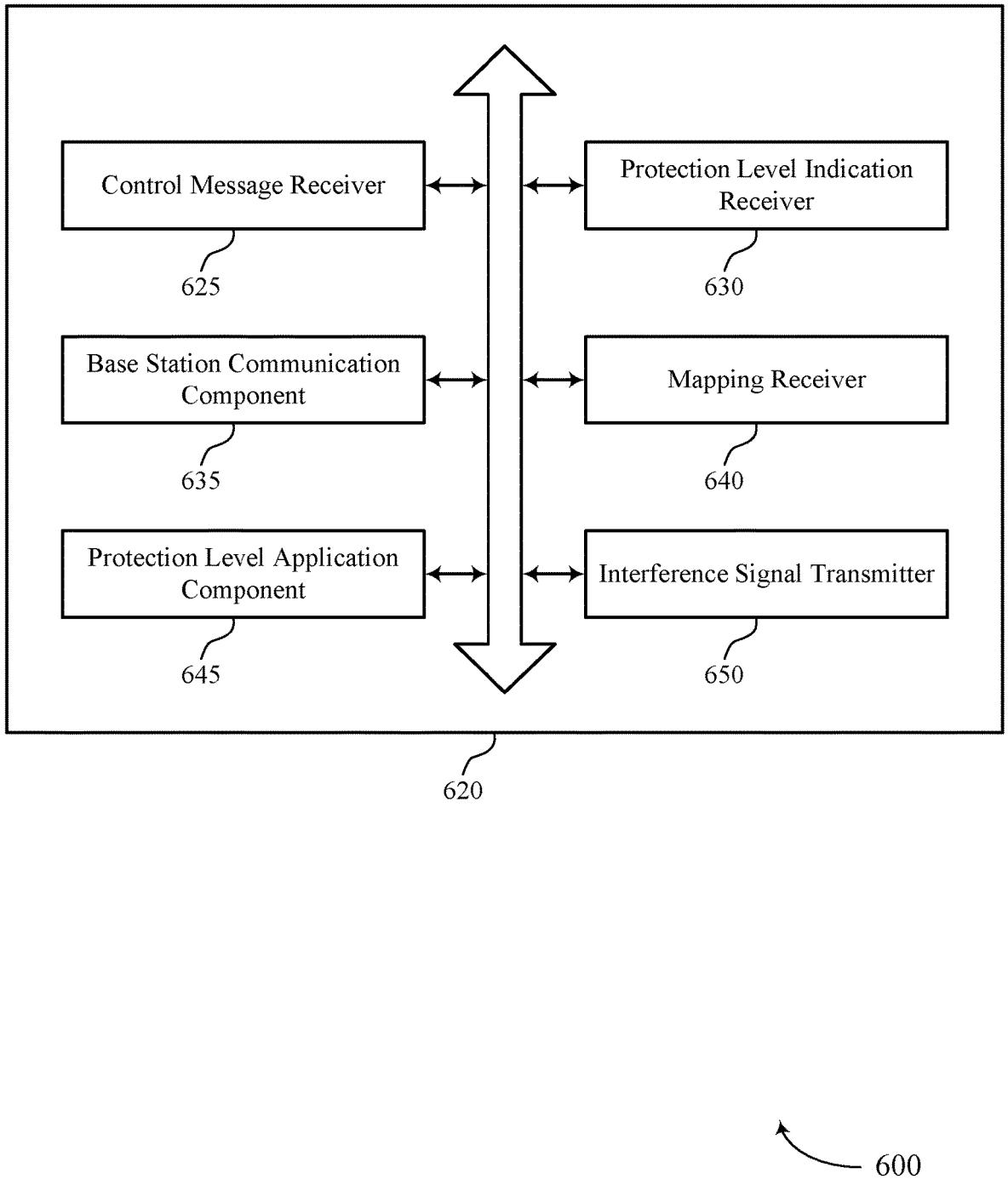
FIG. 6 shows a block diagram of a communications manager that supports protection level indication and configuration in accordance with aspects of the present disclosure.

FIG. 6 shows a block diagram 600 of a communications manager 620 that supports protection level indication and configuration in accordance with aspects of the present disclosure. The communications manager 620 may be an example of aspects of a communications manager 420, a communications manager 520, or both, as described herein. The communications manager 620, or various components thereof, may be an example of means for performing various aspects of protection level indication and configuration as described herein. For example, the communications manager 620 may include a control message receiver 625, a protection level indication receiver 630, a base station communication component 635, a mapping receiver 640, a protection level application component 645, an interference signal transmitter 650, or any combination thereof. Each of these components may communicate, directly or indirectly, with one another (e.g., via one or more buses).

The communications manager 620 may support wireless communication at a UE in accordance with examples as disclosed herein. The control message receiver 625 may be configured as or otherwise support a means for receiving, from a base station, a control message that includes an identification of a set of multiple protection levels corresponding to different degrees of physical layer security for securing communications between the UE and the base station. The protection level indication receiver 630 may be configured as or otherwise support a means for receiving, from the base station, an indication of an identified protection level of the set of multiple protection levels to be used by the UE for securing the communications between the UE and the base station. The base station communication component 635 may be configured as or otherwise support a means for communicating with the base station in accordance with the identified protection level.

In some examples, the mapping receiver 640 may be configured as or otherwise support a means for receiving a mapping of each protection level of the set of multiple protection levels to a respective one or more channels, where the different degrees of physical layer security relate to a number of any type of channels to which the physical layer security is applied.

In some examples, the one or more channels include an uplink control channel, a downlink shared channel, an uplink shared channel, a downlink control channel, or any combination thereof. In some examples, each channel of the one or more channels is associated with a different protection level of the set of multiple protection levels.

In some examples, a first protection level of the set of multiple protection levels and a second protection level of the set of multiple protection levels each map to a same channel.

In some examples, the protection level application component 645 may be configured as or otherwise support a means for applying the identified protection level to the communications with the base station until the UE receives a second control message indicating to change to applying another protection level of the set of multiple protection levels. In some examples, the control message receiver 625 may be configured as or otherwise support a means for receiving the second control message.

In some examples, the interference signal transmitter 650 may be configured as or otherwise support a means for transmitting, during a duration overlapping with communicating with the base station, an interference signal based on receiving the indication of the identified protection level.

In some examples, to support receiving the configuration, the control message receiver 625 may be configured as or otherwise support a means for receiving RRC signaling including the identification of the set of multiple protection levels.

In some examples, to support receiving the indication of the identified protection level, the protection level indication receiver 630 may be configured as or otherwise support a means for receiving downlink control information scheduling the communicating with the base station and including the indication of the identified protection level.

In some examples, to support receiving the indication of the identified protection level, the protection level indication receiver 630 may be configured as or otherwise support a means for receiving medium access control (MAC) control element (MAC-CE) signaling or RRC signaling that indicates the identified protection level.

Figure 7:
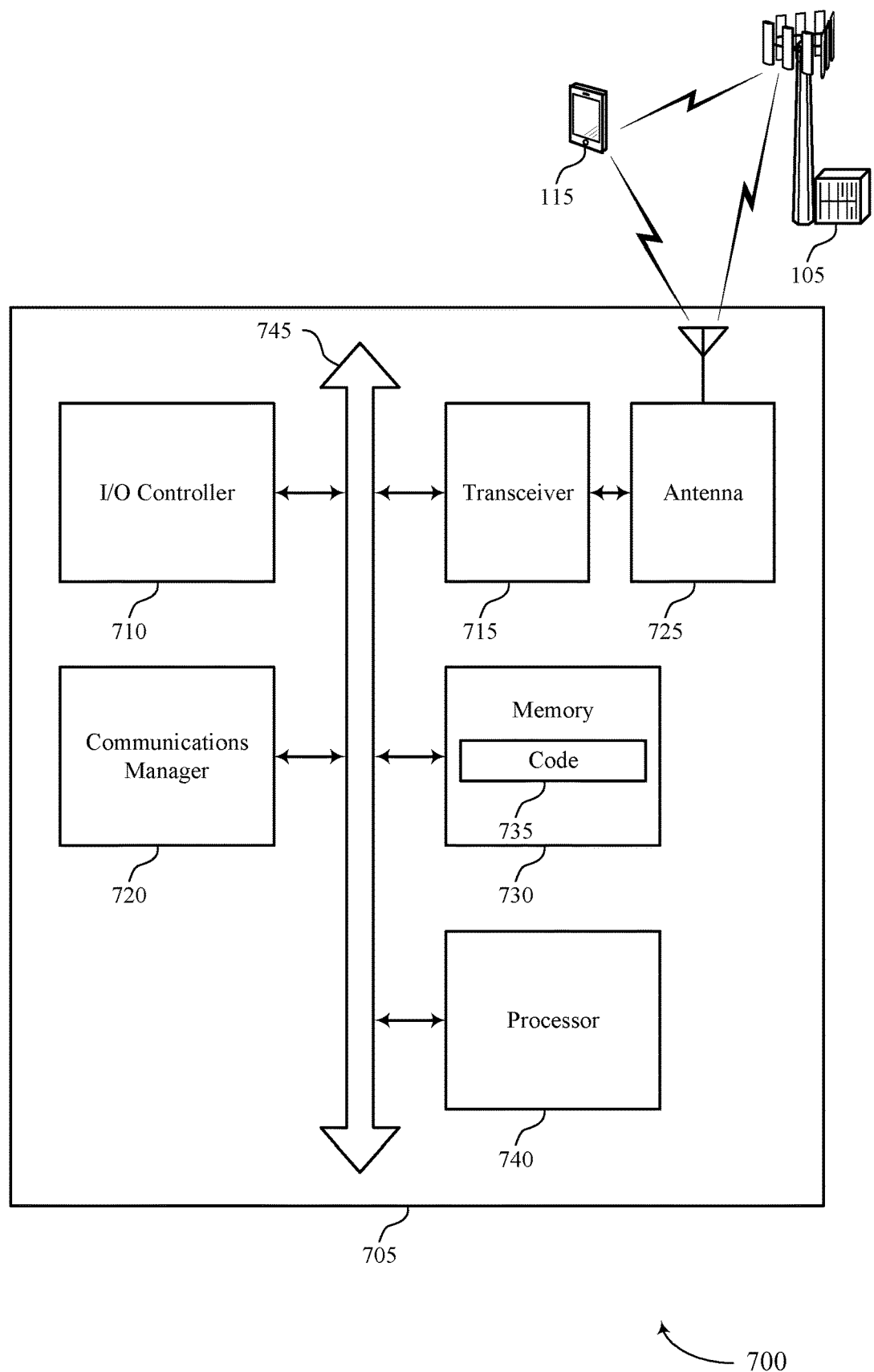
FIG. 7 shows a diagram of a system including a device that supports protection level indication and configuration in accordance with aspects of the present disclosure.

FIG. 7 shows a diagram of a system 700 including a device 705 that supports protection level indication and configuration in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting protection level indication and configuration). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a control message that includes an identification of a set of multiple protection levels corresponding to different degrees of physical layer security for securing communications between the UE and the base station. The communications manager 720 may be configured as or otherwise support a means for receiving, from the base station, an indication of an identified protection level of the set of multiple protection levels to be used by the UE for securing the communications between the UE and the base station. The communications manager 720 may be configured as or otherwise support a means for communicating with the base station in accordance with the identified protection level.

By including or configuring the communications manager 720 in accordance with examples as described herein, the device 705 may support techniques for the device 705 to identify which protection level to use when performing communications over a particular channel or for a particular frequency. Accordingly, the device 705 may selectively secure communications between the device 705 and the base station, which may enable the device 405 to transmit an interference (e.g., jamming) signal (e.g., thus providing security for communications between the device 705 and a base station) when directed or to refrain from transmitting the interference signal (e.g., thus saving energy or resources for other transmissions).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of protection level indication and configuration as described herein, or the processor 740 and the memory 730 may be otherwise configured to perform or support such operations.

Figure 8:
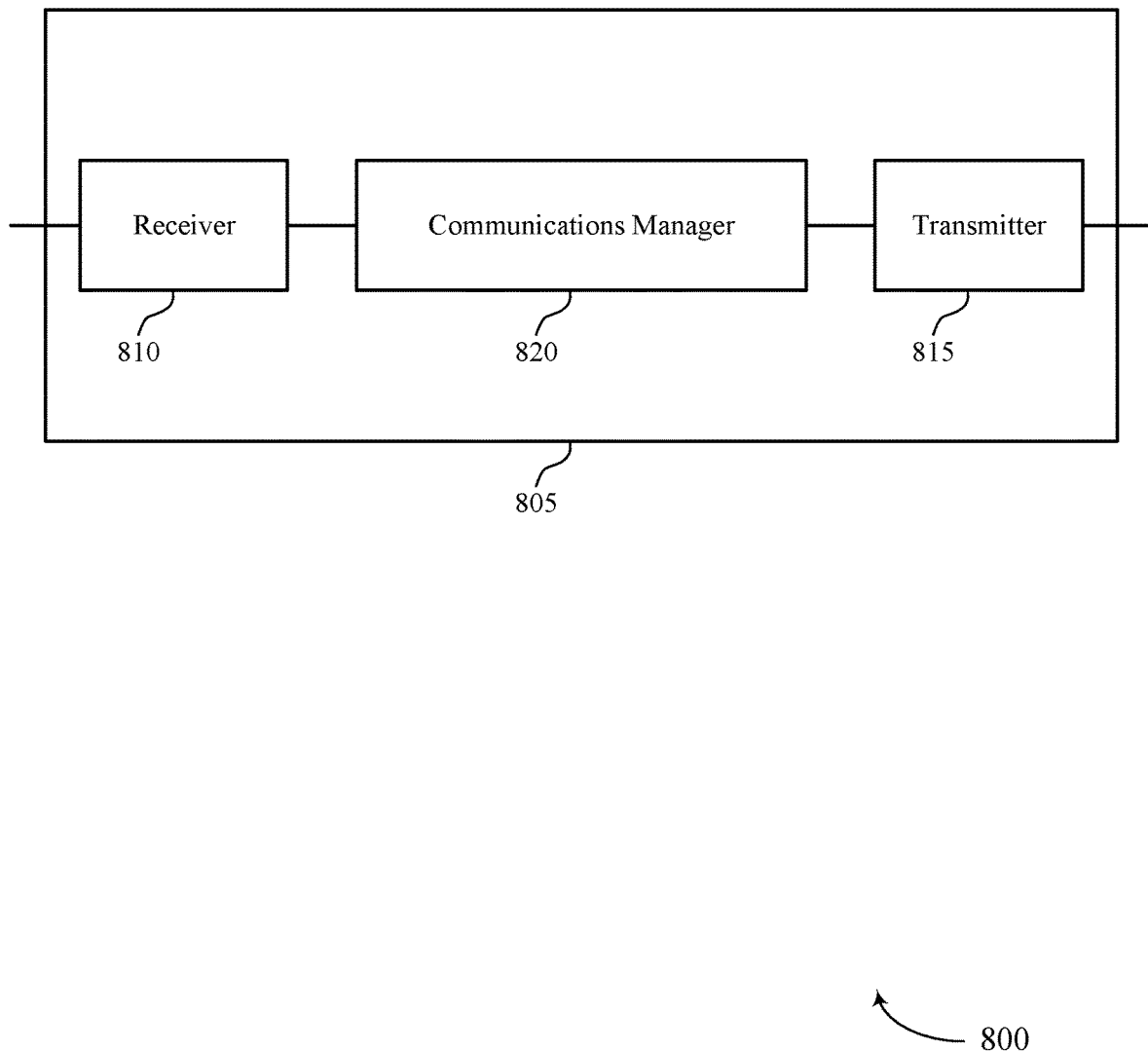
FIGS. 8 and 9 show block diagrams of devices that support protection level indication and configuration in accordance with aspects of the present disclosure.

FIG. 8 shows a block diagram 800 of a device 805 that supports protection level indication and configuration in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to protection level indication and configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to protection level indication and configuration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of protection level indication and configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a control message that includes an identification of a set of multiple protection levels corresponding to different degrees of physical layer security for securing communications between the UE and the base station. The communications manager 820 may be configured as or otherwise support a means for transmitting, to the UE, an indication of an identified protection level of the set of multiple protection levels to be used by the UE for securing the communications between the UE and the base station. The communications manager 820 may be configured as or otherwise support a means for communicating with the UE in accordance with the identified protection level.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for the device 805 to indicate to a UE which protection level to use when performing communications over a particular channel or for a particular frequency. Accordingly, the device 805 may selectively secure communications between the device 805 and the UE, which may enable the UE to transmit an interference (e.g., jamming) signal (e.g., thus providing security for communications between the device 805 and a UE) when directed or to refrain from transmitting the interference signal (e.g., thus saving energy or resources for other transmissions).

Figure 9:
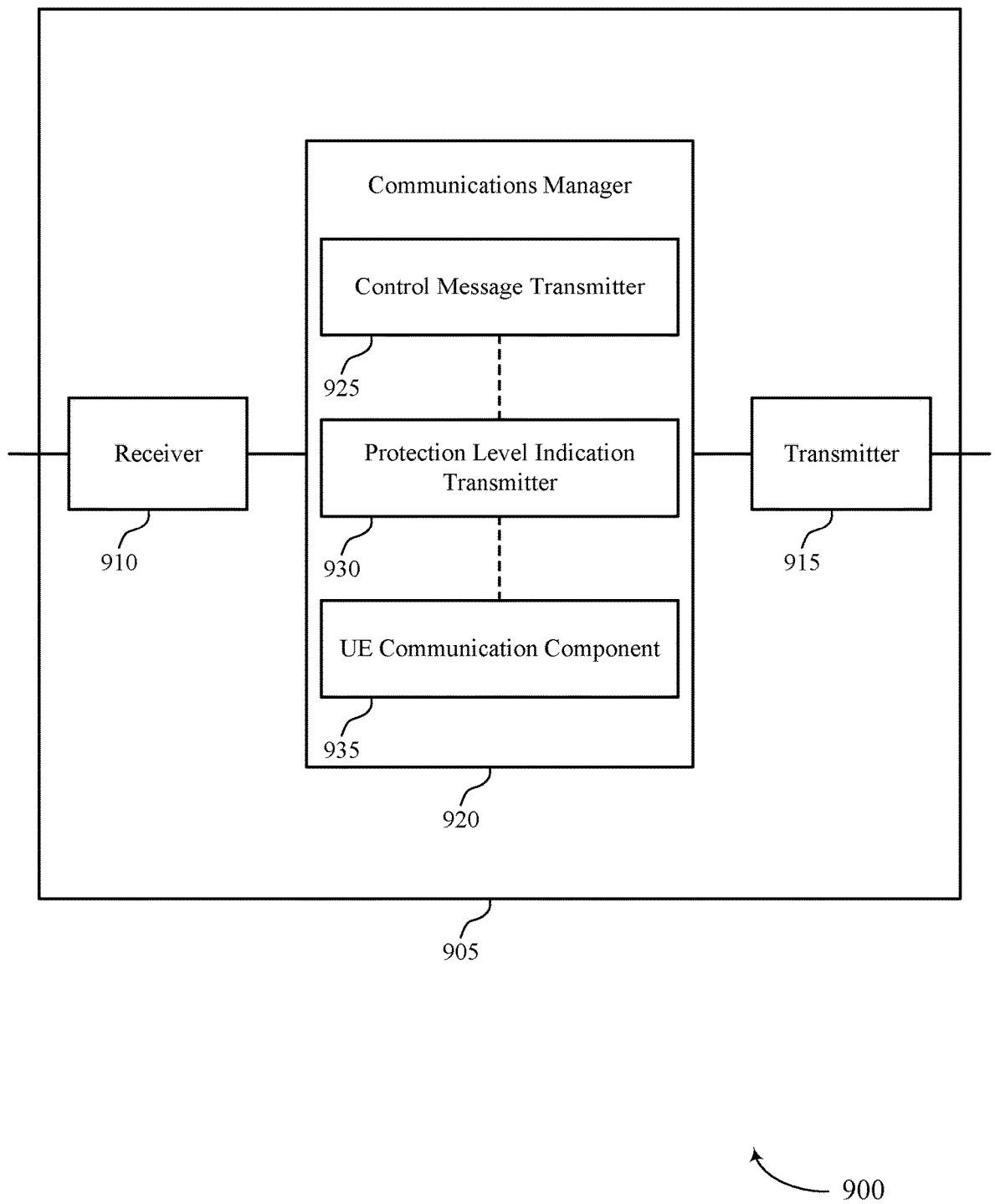

FIG. 9 shows a block diagram 900 of a device 905 that supports protection level indication and configuration in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to protection level indication and configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to protection level indication and configuration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of protection level indication and configuration as described herein. For example, the communications manager 920 may include a control message transmitter 925, a protection level indication transmitter 930, a UE communication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The control message transmitter 925 may be configured as or otherwise support a means for transmitting, to a UE, a control message that includes an identification of a set of multiple protection levels corresponding to different degrees of physical layer security for securing communications between the UE and the base station. The protection level indication transmitter 930 may be configured as or otherwise support a means for transmitting, to the UE, an indication of an identified protection level of the set of multiple protection levels to be used by the UE for securing the communications between the UE and the base station. The UE communication component 935 may be configured as or otherwise support a means for communicating with the UE in accordance with the identified protection level.

Figure 10:
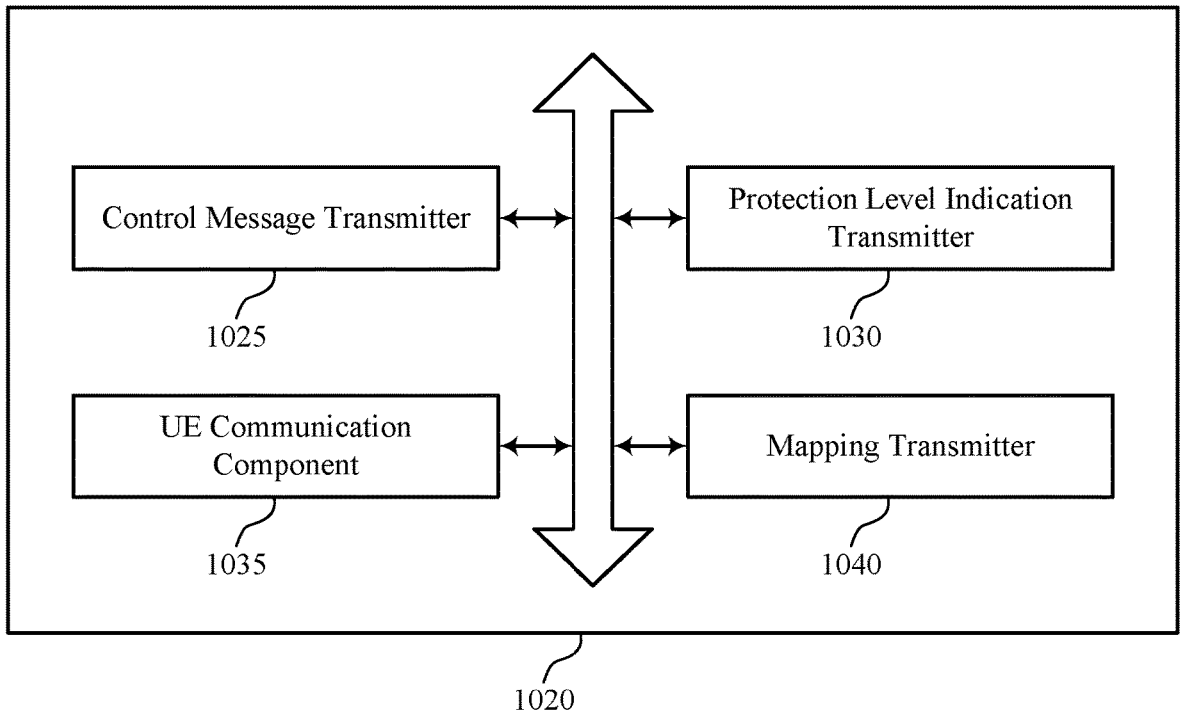
FIG. 10 shows a block diagram of a communications manager that supports protection level indication and configuration in accordance with aspects of the present disclosure.

FIG. 10 shows a block diagram 1000 of a communications manager 1020 that supports protection level indication and configuration in accordance with aspects of the present disclosure. The communications manager 1020 may be an example of aspects of a communications manager 820, a communications manager 920, or both, as described herein. The communications manager 1020, or various components thereof, may be an example of means for performing various aspects of protection level indication and configuration as described herein. For example, the communications manager 1020 may include a control message transmitter 1025, a protection level indication transmitter 1030, a UE communication component 1035, a mapping transmitter 1040, or any combination thereof. Each of these components may communicate, directly or indirectly, with one another (e.g., via one or more buses).

The communications manager 1020 may support wireless communication at a base station in accordance with examples as disclosed herein. The control message transmitter 1025 may be configured as or otherwise support a means for transmitting, to a UE, a control message that includes an identification of a set of multiple protection levels corresponding to different degrees of physical layer security for securing communications between the UE and the base station. The protection level indication transmitter 1030 may be configured as or otherwise support a means for transmitting, to the UE, an indication of an identified protection level of the set of multiple protection levels to be used by the UE for securing the communications between the UE and the base station. The UE communication component 1035 may be configured as or otherwise support a means for communicating with the UE in accordance with the identified protection level.

In some examples, the mapping transmitter 1040 may be configured as or otherwise support a means for transmitting a mapping of each protection level of the set of multiple protection levels to a respective one or more channels, where the different degrees of physical layer security relate to a number of any type of channels to which the physical layer security is applied.

In some examples, the one or more channels include an uplink control channel, a downlink shared channel, an uplink shared channel, a downlink control channel, or any combination thereof. In some examples, each channel of the one or more channels is associated with a different protection level of the set of multiple protection levels.

In some examples, a first protection level of the set of multiple protection levels and a second protection level of the set of multiple protection levels each map to a same channel.

In some examples, to support transmitting the configuration, the control message transmitter 1025 may be configured as or otherwise support a means for transmitting RRC signaling including the identification of the set of multiple protection levels.

In some examples, to support transmitting the indication of the identified protection level, the protection level indication transmitter 1030 may be configured as or otherwise support a means for transmitting downlink control information scheduling the communicating with the UE and including the indication of the identified protection level.

In some examples, to support transmitting the indication of the identified protection level, the protection level indication transmitter 1030 may be configured as or otherwise support a means for transmitting medium access control (MAC) control element (MAC-CE) signaling or RRC signaling that indicates the identified protection level.

Figure 11:
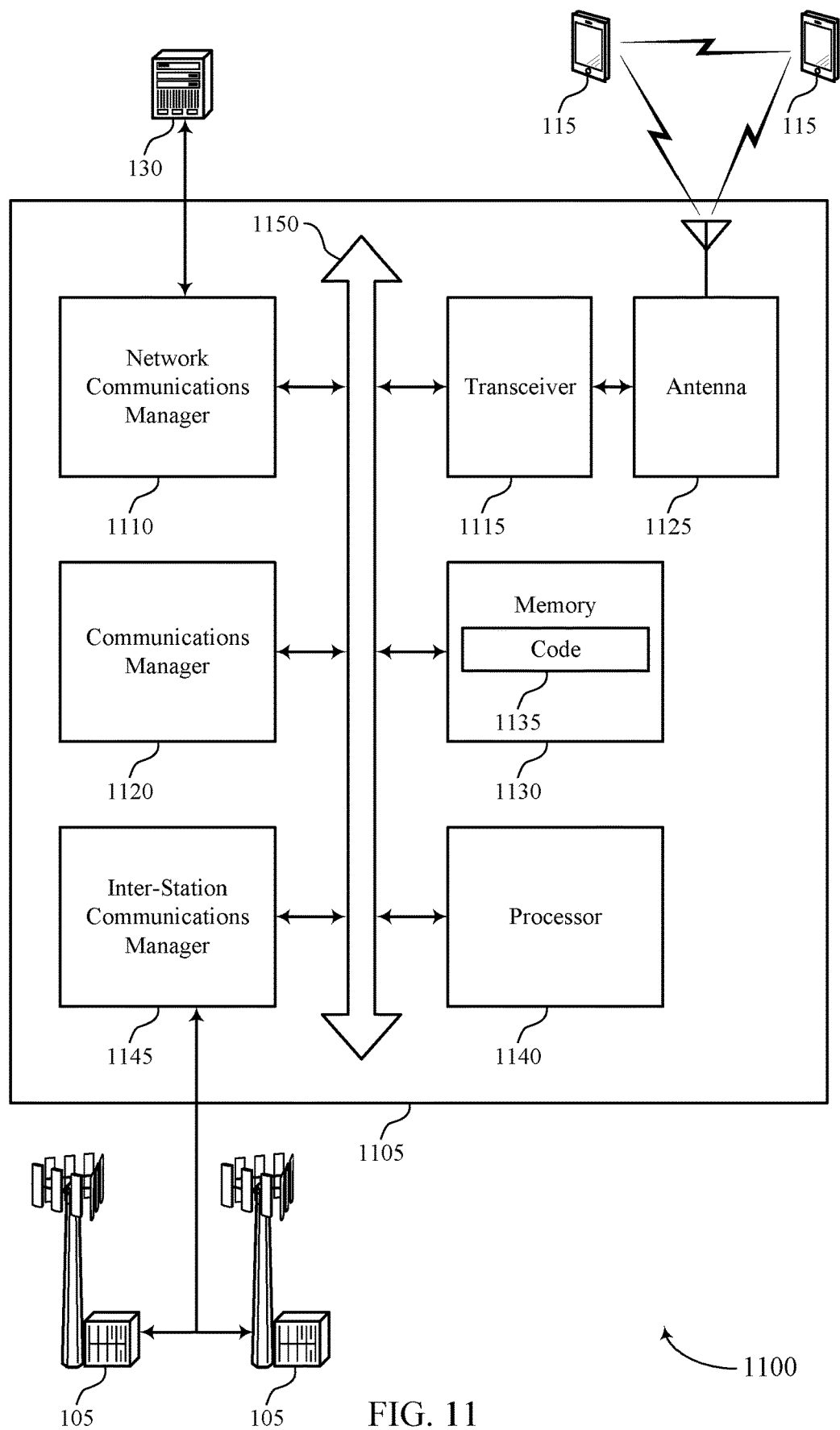
FIG. 11 shows a diagram of a system including a device that supports protection level indication and configuration in accordance with aspects of the present disclosure.

FIG. 11 shows a diagram of a system 1100 including a device 1105 that supports protection level indication and configuration in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting protection level indication and configuration). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a control message that includes an identification of a set of multiple protection levels corresponding to different degrees of physical layer security for securing communications between the UE and the base station. The communications manager 1120 may be configured as or otherwise support a means for transmitting, to the UE, an indication of an identified protection level of the set of multiple protection levels to be used by the UE for securing the communications between the UE and the base station. The communications manager 1120 may be configured as or otherwise support a means for communicating with the UE in accordance with the identified protection level.

By including or configuring the communications manager 1120 in accordance with examples as described herein, the device 1105 may support techniques for device 1105 to indicate to a UE which protection level to use when performing communications over a particular channel or for a particular frequency. Accordingly, the device 1105 may selectively secure communications between the device 1105 and the UE, which may enable the UE to transmit an interference (e.g., jamming) signal (e.g., thus providing security for communications between the device 1105 and a UE) when directed or to refrain from transmitting the interference signal (e.g., thus saving energy or resources for other transmissions).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of protection level indication and configuration as described herein, or the processor 1140 and the memory 1130 may be otherwise configured to perform or support such operations.

Figure 12:
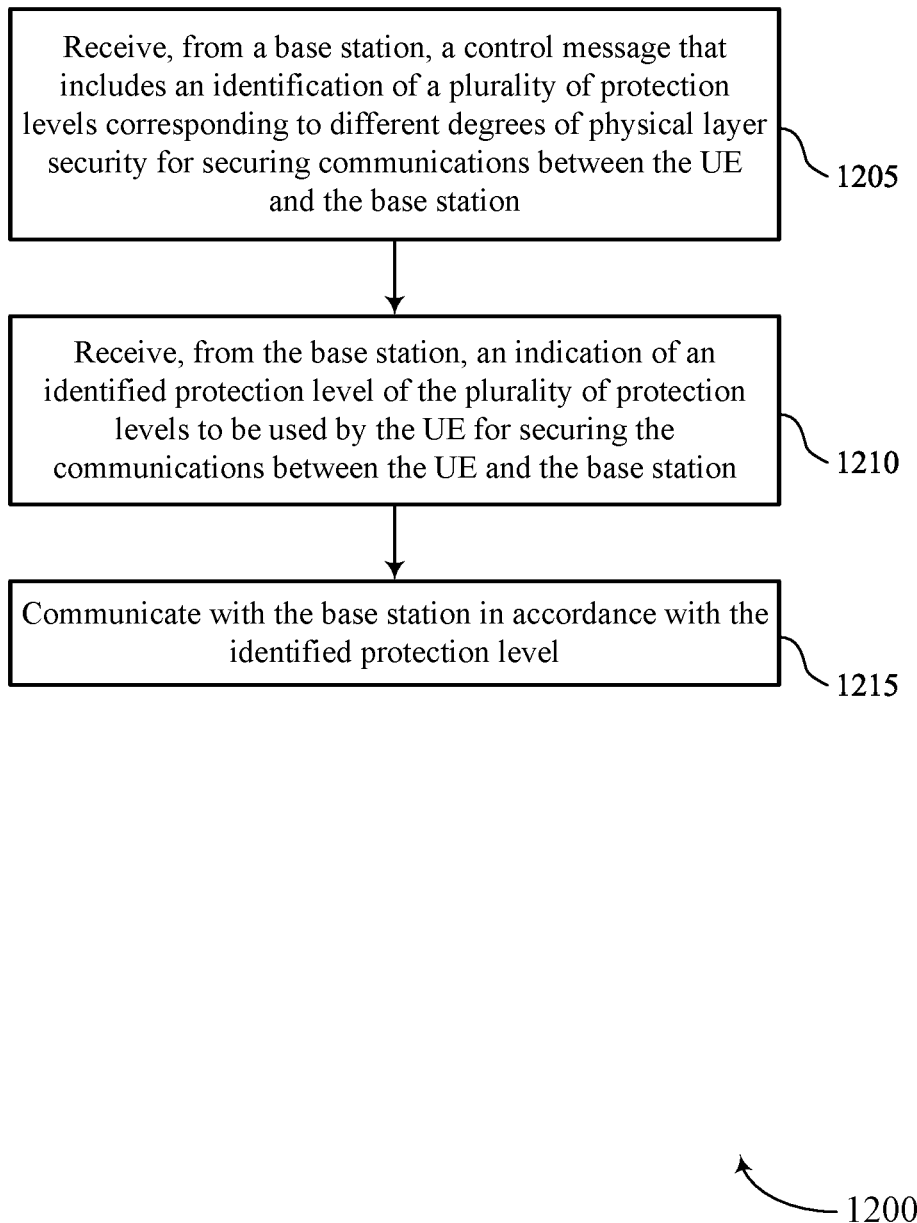
FIGS. 12 through 16 show flowcharts illustrating methods that support protection level indication and configuration in accordance with aspects of the present disclosure.

FIG. 12 shows a flowchart illustrating a method 1200 that supports protection level indication and configuration in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a control message that includes an identification of a set of multiple protection levels corresponding to different degrees of physical layer security for securing communications between the UE and the base station. The operations of 1205 may be performed in accordance with examples as disclosed herein. In some examples, aspects of the operations of 1205 may be performed by a control message receiver 625 as described with reference to FIG. 6.

At 1210, the method may include receiving, from the base station, an indication of an identified protection level of the set of multiple protection levels to be used by the UE for securing the communications between the UE and the base station. The operations of 1210 may be performed in accordance with examples as disclosed herein. In some examples, aspects of the operations of 1210 may be performed by a protection level indication receiver 630 as described with reference to FIG. 6.

At 1215, the method may include communicating with the base station in accordance with the identified protection level. The operations of 1215 may be performed in accordance with examples as disclosed herein. In some examples, aspects of the operations of 1215 may be performed by a base station communication component 635 as described with reference to FIG. 6.

Figure 13:
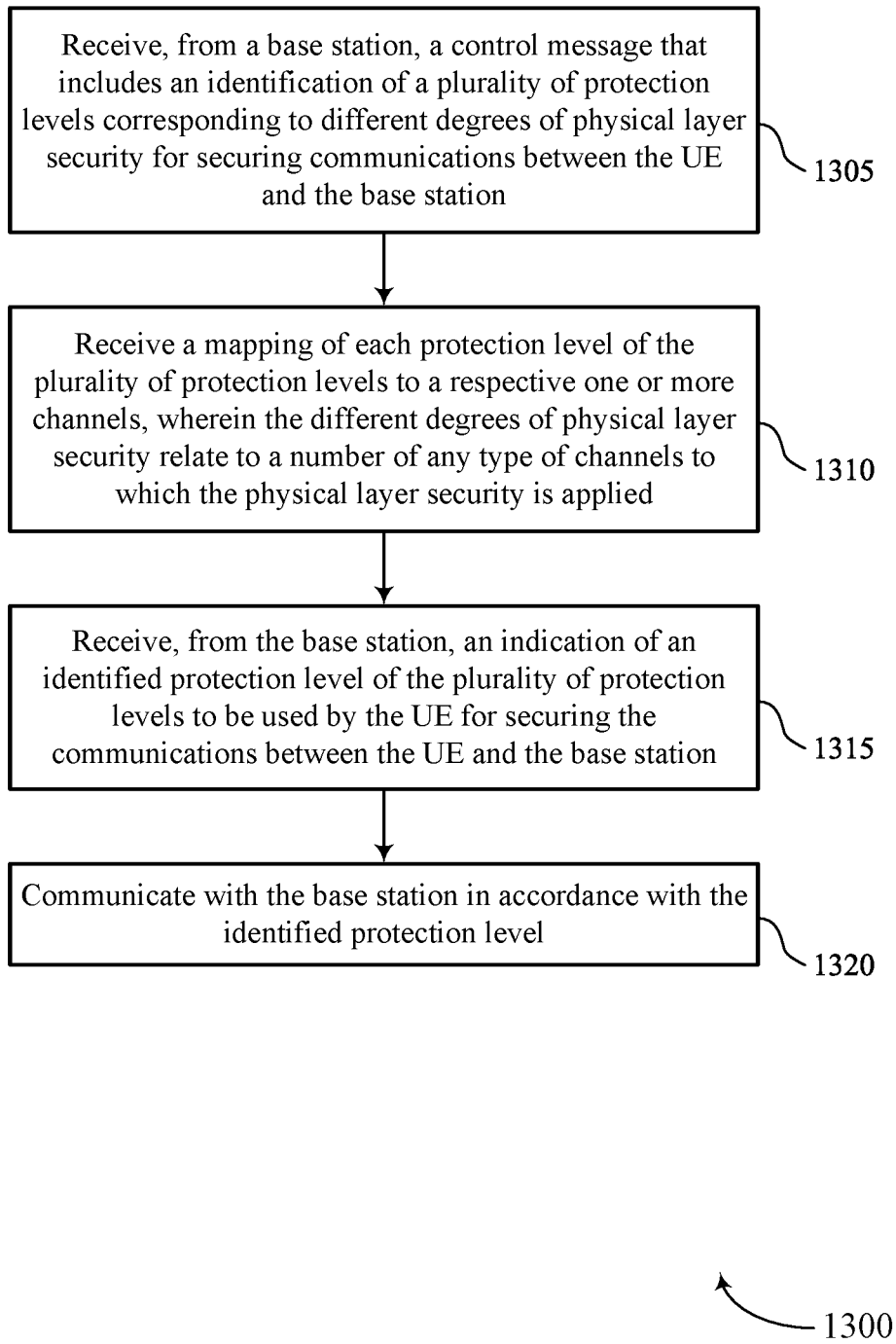

FIG. 13 shows a flowchart illustrating a method 1300 that supports protection level indication and configuration in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a control message that includes an identification of a set of multiple protection levels corresponding to different degrees of physical layer security for securing communications between the UE and the base station. The operations of 1305 may be performed in accordance with examples as disclosed herein. In some examples, aspects of the operations of 1305 may be performed by a control message receiver 625 as described with reference to FIG. 6.

At 1310, the method may include receiving a mapping of each protection level of the set of multiple protection levels to a respective one or more channels, where the different degrees of physical layer security relate to a number of any type of channels to which the physical layer security is applied. The operations of 1310 may be performed in accordance with examples as disclosed herein. In some examples, aspects of the operations of 1310 may be performed by a mapping receiver 640 as described with reference to FIG. 6.

At 1315, the method may include receiving, from the base station, an indication of an identified protection level of the set of multiple protection levels to be used by the UE for securing the communications between the UE and the base station. The operations of 1315 may be performed in accordance with examples as disclosed herein. In some examples, aspects of the operations of 1315 may be performed by a protection level indication receiver 630 as described with reference to FIG. 6.

At 1320, the method may include communicating with the base station in accordance with the identified protection level. The operations of 1320 may be performed in accordance with examples as disclosed herein. In some examples, aspects of the operations of 1320 may be performed by a base station communication component 635 as described with reference to FIG. 6.

Figure 14:
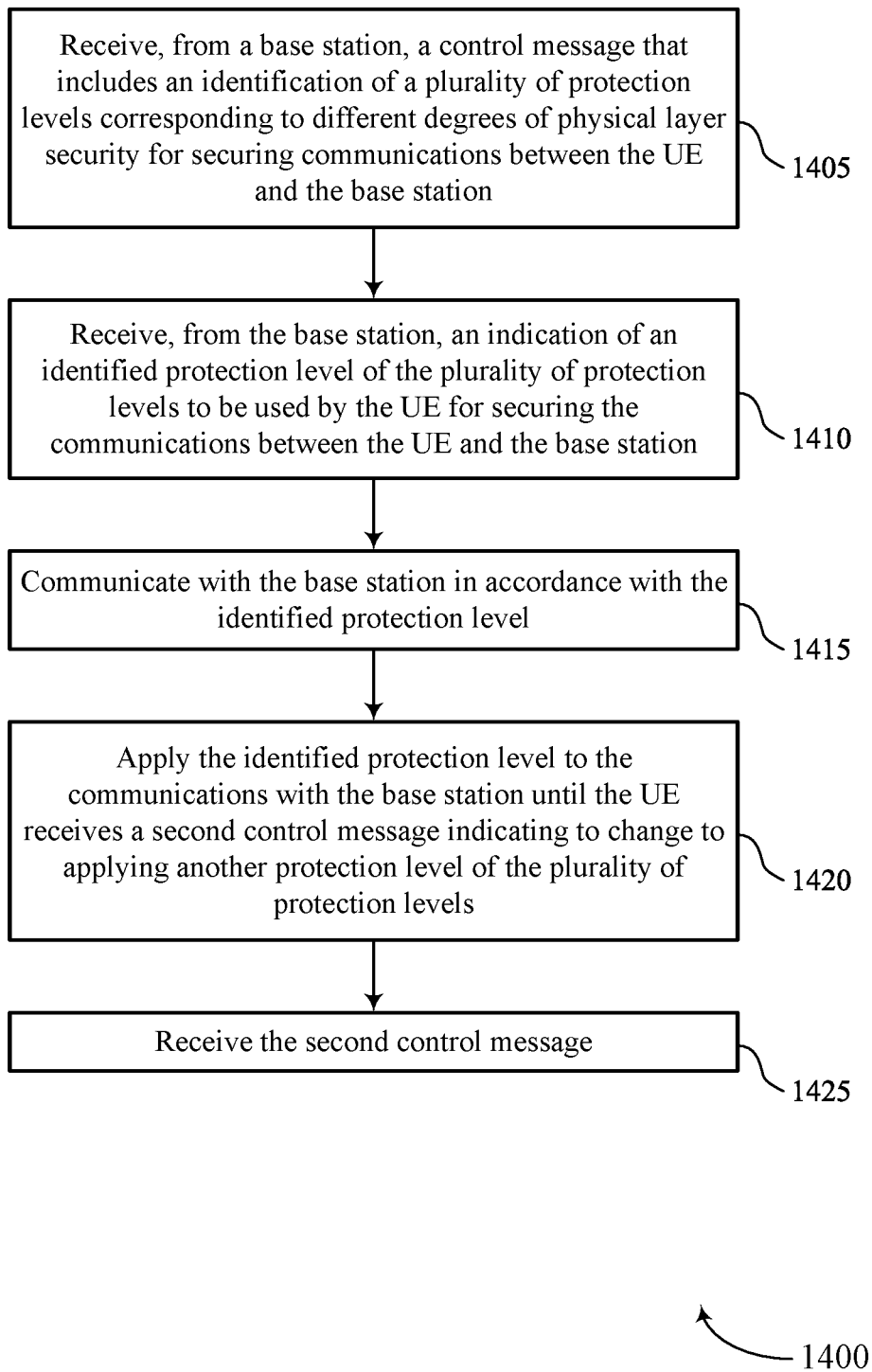

FIG. 14 shows a flowchart illustrating a method 1400 that supports protection level indication and configuration in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a control message that includes an identification of a set of multiple protection levels corresponding to different degrees of physical layer security for securing communications between the UE and the base station. The operations of 1405 may be performed in accordance with examples as disclosed herein. In some examples, aspects of the operations of 1405 may be performed by a control message receiver 625 as described with reference to FIG. 6.

At 1410, the method may include receiving, from the base station, an indication of an identified protection level of the set of multiple protection levels to be used by the UE for securing the communications between the UE and the base station. The operations of 1410 may be performed in accordance with examples as disclosed herein. In some examples, aspects of the operations of 1410 may be performed by a protection level indication receiver 630 as described with reference to FIG. 6.

At 1415, the method may include communicating with the base station in accordance with the identified protection level. The operations of 1415 may be performed in accordance with examples as disclosed herein. In some examples, aspects of the operations of 1415 may be performed by a base station communication component 635 as described with reference to FIG. 6.

At 1420, the method may include applying the identified protection level to the communications with the base station until the UE receives a second control message indicating to change to applying another protection level of the set of multiple protection levels. The operations of 1420 may be performed in accordance with examples as disclosed herein. In some examples, aspects of the operations of 1420 may be performed by a protection level application component 645 as described with reference to FIG. 6.

At 1425, the method may include receiving the second control message. The operations of 1425 may be performed in accordance with examples as disclosed herein. In some examples, aspects of the operations of 1425 may be performed by a control message receiver 625 as described with reference to FIG. 6.

Figure 15:
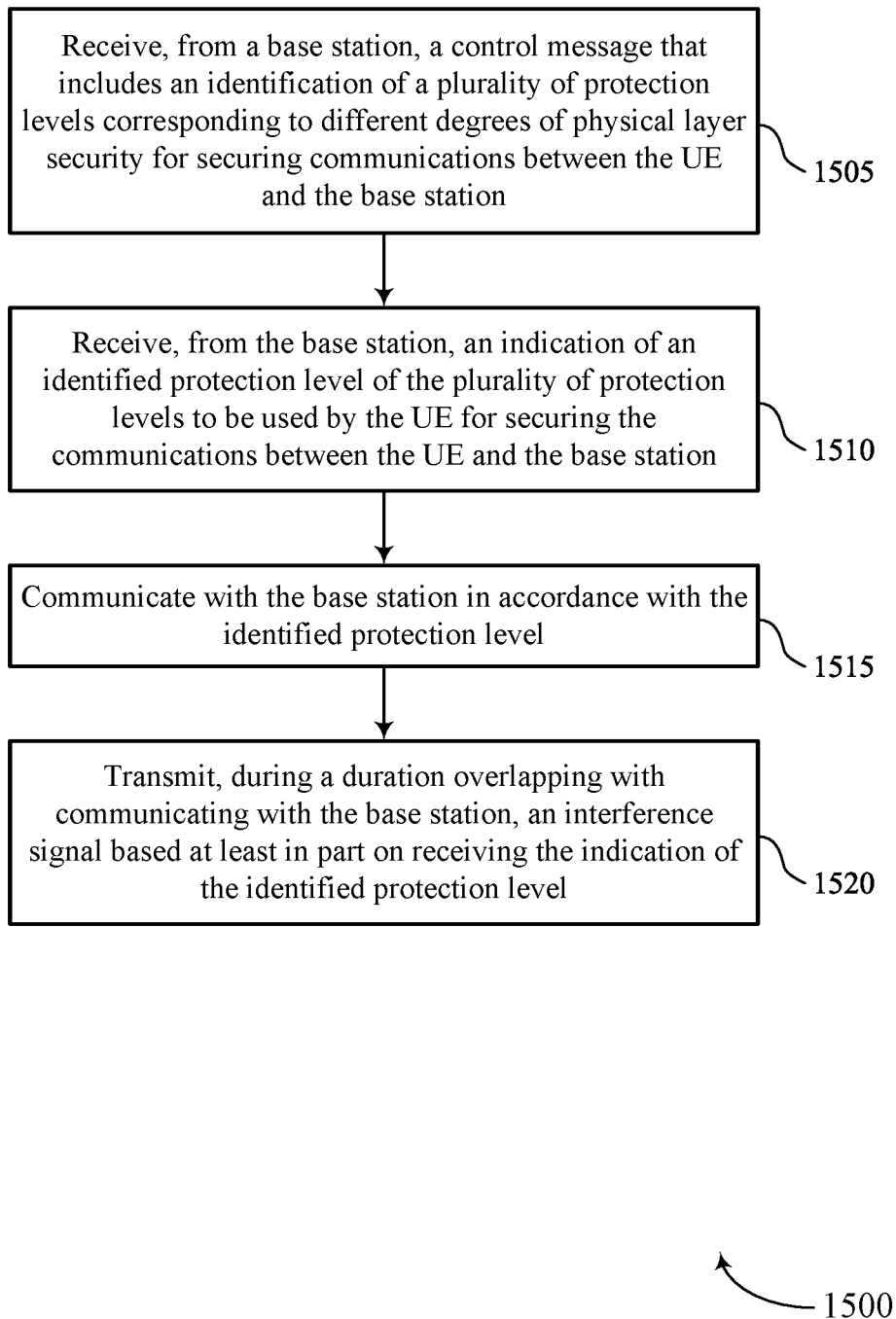

FIG. 15 shows a flowchart illustrating a method 1500 that supports protection level indication and configuration in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a control message that includes an identification of a set of multiple protection levels corresponding to different degrees of physical layer security for securing communications between the UE and the base station. The operations of 1505 may be performed in accordance with examples as disclosed herein. In some examples, aspects of the operations of 1505 may be performed by a control message receiver 625 as described with reference to FIG. 6.

At 1510, the method may include receiving, from the base station, an indication of an identified protection level of the set of multiple protection levels to be used by the UE for securing the communications between the UE and the base station. The operations of 1510 may be performed in accordance with examples as disclosed herein. In some examples, aspects of the operations of 1510 may be performed by a protection level indication receiver 630 as described with reference to FIG. 6.

At 1515, the method may include communicating with the base station in accordance with the identified protection level. The operations of 1515 may be performed in accordance with examples as disclosed herein. In some examples, aspects of the operations of 1515 may be performed by a base station communication component 635 as described with reference to FIG. 6.

At 1520, the method may include transmitting, during a duration overlapping with communicating with the base station, an interference signal based on receiving the indication of the identified protection level. The operations of 1520 may be performed in accordance with examples as disclosed herein. In some examples, aspects of the operations of 1520 may be performed by an interference signal transmitter 650 as described with reference to FIG. 6.

Figure 16:
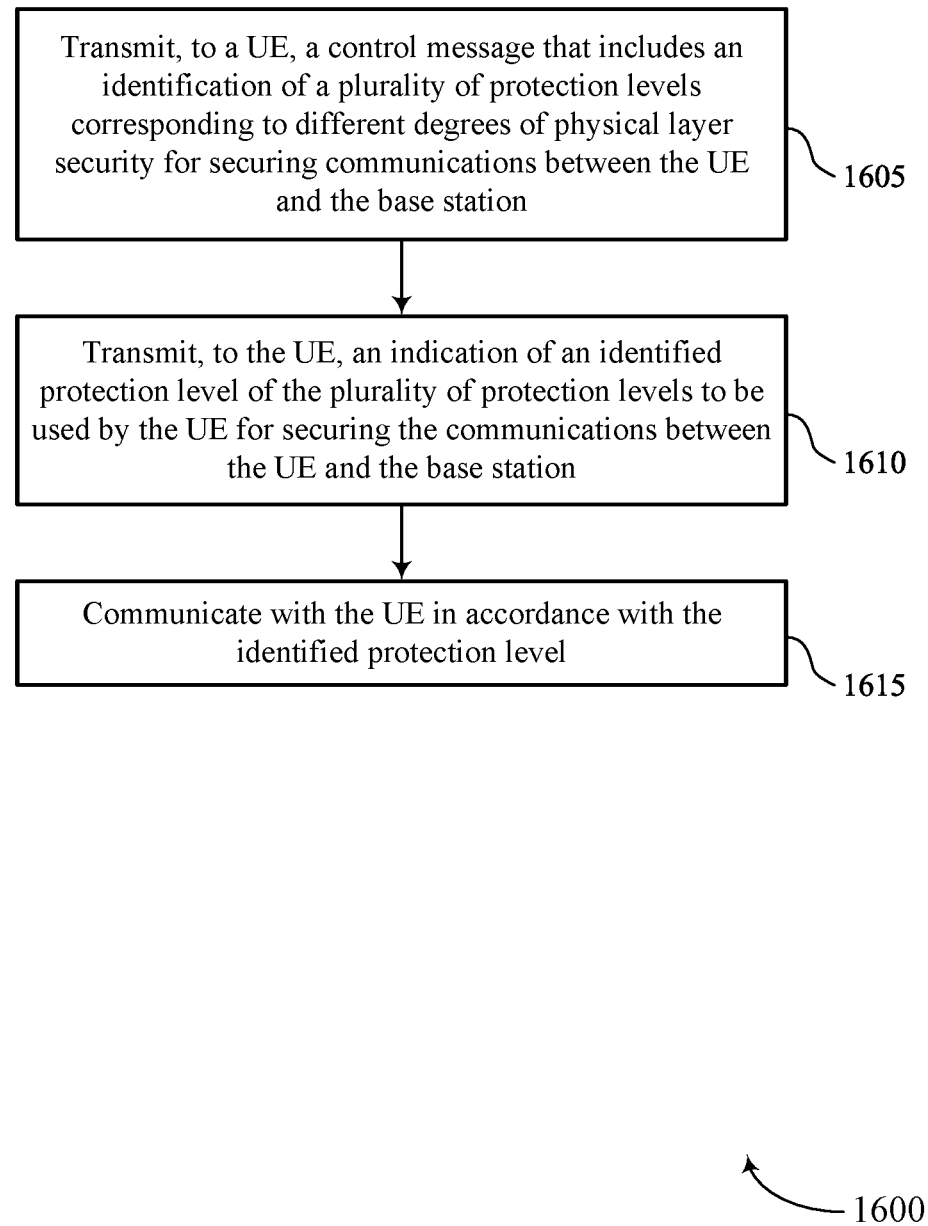

FIG. 16 shows a flowchart illustrating a method 1600 that supports protection level indication and configuration in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, a control message that includes an identification of a set of multiple protection levels corresponding to different degrees of physical layer security for securing communications between the UE and the base station. The operations of 1605 may be performed in accordance with examples as disclosed herein. In some examples, aspects of the operations of 1605 may be performed by a control message transmitter 1025 as described with reference to FIG. 10.

At 1610, the method may include transmitting, to the UE, an indication of an identified protection level of the set of multiple protection levels to be used by the UE for securing the communications between the UE and the base station. The operations of 1610 may be performed in accordance with examples as disclosed herein. In some examples, aspects of the operations of 1610 may be performed by a protection level indication transmitter 1030 as described with reference to FIG. 10.

At 1615, the method may include communicating with the UE in accordance with the identified protection level. The operations of 1615 may be performed in accordance with examples as disclosed herein. In some examples, aspects of the operations of 1615 may be performed by a UE communication component 1035 as described with reference to FIG. 10.

The following provides an overview of aspects of the present disclosure:

Aspect 1: A method for wireless communication at a UE, comprising: receiving, from a base station, a control message that includes an identification of a plurality of protection levels corresponding to different degrees of physical layer security for securing communications between the UE and the base station; receiving, from the base station, an indication of an identified protection level of the plurality of protection levels to be used by the UE for securing the communications between the UE and the base station; and communicating with the base station in accordance with the identified protection level.

Aspect 2: The method of aspect 1, further comprising: receiving a mapping of each protection level of the plurality of protection levels to a respective one or more channels, wherein the different degrees of physical layer security relate to a number of any type of channels to which the physical layer security is applied.

Aspect 3: The method of aspect 2, wherein the one or more channels comprise an uplink control channel, a downlink shared channel, an uplink shared channel, a downlink control channel, or any combination thereof, and each channel of the one or more channels is associated with a different protection level of the plurality of protection levels.

Aspect 4: The method of any of aspects 2 through 3, wherein a first protection level of the plurality of protection levels and a second protection level of the plurality of protection levels each map to a same channel.

Aspect 5: The method of any of aspects 1 through 4, further comprising: applying the identified protection level to the communications with the base station until the UE receives a second control message indicating to change to applying another protection level of the plurality of protection levels; and receiving the second control message.

Aspect 6: The method of any of aspects 1 through 5, further comprising: transmitting, during a duration overlapping with communicating with the base station, an interference signal based at least in part on receiving the indication of the identified protection level.

Aspect 7: The method of any of aspects 1 through 6, wherein receiving the control message comprises: receiving RRC signaling including the identification of the plurality of protection levels.

Aspect 8: The method of any of aspects 1 through 7, wherein receiving the indication of the identified protection level comprises: receiving downlink control information scheduling the communicating with the base station and comprising the indication of the identified protection level.

Aspect 9: The method of any of aspects 1 through 8, wherein receiving the indication of the identified protection level comprises: receiving medium access control (MAC) control element (MAC-CE) signaling or RRC signaling that indicates the identified protection level.

Aspect 10: The method of any of aspects 1 through 9, wherein a first protection level of the plurality of protection levels provides physical layer security to a physical uplink control channel and a second protection level of the plurality of protection levels provides physical layer security to the physical uplink control channel and a physical uplink shared channel.

Aspect 11: The method of any of aspects 1 through 10, further comprising transmitting, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

Aspect 12: A method for wireless communication at a base station, comprising: transmitting, to a UE, a control message that includes an identification of a plurality of protection levels corresponding to different degrees of physical layer security for securing communications between the UE and the base station; transmitting, to the UE, an indication of an identified protection level of the plurality of protection levels to be used by the UE for securing the communications between the UE and the base station; and communicating with the UE in accordance with the identified protection level.

Aspect 13: The method of aspect 12, further comprising: transmitting a mapping of each protection level of the plurality of protection levels to a respective one or more channels, wherein the different degrees of physical layer security relate to a number of any type of channels to which the physical layer security is applied.

Aspect 14: The method of aspect 13, wherein the one or more channels comprise an uplink control channel, a downlink shared channel, an uplink shared channel, a downlink control channel, or any combination thereof, and each channel of the one or more channels is associated with a different protection level of the plurality of protection levels Aspect 15: The method of any of aspects 12 through 13, wherein a first protection level of the plurality of protection levels and a second protection level of the plurality of protection levels each map to a same channel.

Aspect 16: The method of any of aspects 12 through 15, wherein transmitting the control message comprises: transmitting RRC signaling including the identification of the plurality of protection levels.

Aspect 17: The method of any of aspects 12 through 16, wherein transmitting the indication of the identified protection level comprises: transmitting downlink control information scheduling the communicating with the UE and comprising the indication of the identified protection level.

Aspect 18: The method of any of aspects 12 through 17, wherein transmitting the indication of the identified protection level comprises: transmitting medium access control (MAC) control element (MAC-CE) signaling or RRC signaling that indicates the identified protection level.

Aspect 19: The method of any of aspects 12 through 18, wherein a first protection level of the plurality of protection levels provides physical layer security to a physical uplink control channel and a second protection level of the plurality of protection levels provides physical layer security to the physical uplink control channel and a physical uplink shared channel.

Aspect 20: The method of any of aspects 12 through 19, further comprising receiving an interference signal overlapping with one or more first transmissions of the physical uplink control channel when the interference signal corresponds to the first protection level or overlapping with one or more second transmissions of the physical uplink control channel, the physical uplink shared channel, or both when the interference signal corresponds to the second protection level.

Aspect 21: An apparatus for wireless communication at a UE, comprising a processor; memory coupled with the processor; and instructions stored in the memory and executable by the processor to cause the apparatus to perform a method of any of aspects 1 through 11.

Aspect 22: An apparatus for wireless communication at a UE, comprising at least one means for performing a method of any of aspects 1 through 11.

Aspect 23: A non-transitory computer-readable medium storing code for wireless communication at a UE, the code comprising instructions executable by a processor to perform a method of any of aspects 1 through 11.

Aspect 24: An apparatus for wireless communication at a base station, comprising a processor; memory coupled with the processor; and instructions stored in the memory and executable by the processor to cause the apparatus to perform a method of any of aspects 12 through 20.

Aspect 25: An apparatus for wireless communication at a base station, comprising at least one means for performing a method of any of aspects 12 through 20.

Aspect 26: A non-transitory computer-readable medium storing code for wireless communication at a base station, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a control message that includes an identification of a plurality of protection levels corresponding to different degrees of physical layer security for securing communications between the UE and the base station;
   receiving, from the base station, an indication of an identified protection level of the plurality of protection levels to be used by the UE for securing the communications between the UE and the base station; and
   communicating with the base station in accordance with the identified protection level.

2. The method of claim 1, wherein a first protection level of the plurality of protection levels provides physical layer security to a physical uplink control channel and a second protection level of the plurality of protection levels provides physical layer security to the physical uplink control channel and a physical uplink shared channel.

3. The method of claim 2, further comprising:
   transmitting, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

4. The method of claim 1, further comprising:
   receiving a mapping of each protection level of the plurality of protection levels to a respective one or more channels, wherein the different degrees of physical layer security relate to a number of any type of channels to which the physical layer security is applied.

5. The method of claim 4, wherein
   the one or more channels comprise an uplink control channel, a downlink shared channel, an uplink shared channel, a downlink control channel, or any combination thereof, and
   each channel of the one or more channels is associated with a different protection level of the plurality of protection levels.

6. The method of claim 4, wherein a first protection level of the plurality of protection levels and a second protection level of the plurality of protection levels each map to a same channel.

7. The method of claim 1, further comprising:
   applying the identified protection level to the communications with the base station until the UE receives a second control message indicating to change to applying another protection level of the plurality of protection levels; and
   receiving the second control message.

8. The method of claim 1, further comprising:
   transmitting, during a duration overlapping with communicating with the base station, an interference signal based at least in part on receiving the indication of the identified protection level.

9. The method of claim 1, wherein receiving the control message comprises:
   receiving radio resource control (RRC) signaling including the identification of the plurality of protection levels.

10. The method of claim 1, wherein receiving the indication of the identified protection level comprises:
    receiving downlink control information scheduling the communicating with the base station and comprising the indication of the identified protection level.

11. The method of claim 1, wherein receiving the indication of the identified protection level comprises:
    receiving medium access control (MAC) control element (MAC-CE) signaling or radio resource control (RRC) signaling that indicates the identified protection level.

12. A method for wireless communication at a base station, comprising:
    transmitting, to a user equipment (UE), a control message that includes an identification of a plurality of protection levels corresponding to different degrees of physical layer security for securing communications between the UE and the base station;

transmitting, to the UE, an indication of an identified protection level of the plurality of protection levels to be used by the UE for securing the communications between the UE and the base station; and communicating with the UE in accordance with the identified protection level.

13. The method of claim 12, wherein a first protection level of the plurality of protection levels provides physical layer security to a physical uplink control channel and a second protection level of the plurality of protection levels provides physical layer security to the physical uplink control channel and a physical uplink shared channel.

14. The method of claim 13, further comprising:

receiving, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

15. The method of claim 12, further comprising:

transmitting a mapping of each protection level of the plurality of protection levels to a respective one or more channels, wherein the different degrees of physical layer security relate to a number of any type of channels to which the physical layer security is applied.

16. The method of claim 15, wherein the one or more channels comprise an uplink control channel, a downlink shared channel, an uplink shared channel, a downlink control channel, or any combination thereof, and each channel of the one or more channels is associated with a different protection level of the plurality of protection levels.

17. The method of claim 15, wherein a first protection level of the plurality of protection levels and a second protection level of the plurality of protection levels each map to a same channel.

18. The method of claim 12, wherein transmitting the control message comprises:

transmitting radio resource control (RRC) signaling including the identification of the plurality of protection levels.

19. The method of claim 12, wherein transmitting the indication of the identified protection level comprises:

transmitting downlink control information scheduling the communicating with the UE and comprising the indication of the identified protection level.

20. The method of claim 12, wherein transmitting the indication of the identified protection level comprises:

transmitting medium access control (MAC) control element (MAC-CE) signaling or radio resource control (RRC) signaling that indicates the identified protection level.

21. A user equipment (UE), comprising:

a processor;

memory coupled with the processor; and instructions stored in the memory and executable by the processor to cause the UE to:

receive, from a base station, a control message that includes an identification of a plurality of protection levels corresponding to different degrees of physical layer security for securing communications between the UE and the base station;

receive, from the base station, an indication of an identified protection level of the plurality of protection levels to be used by the UE for securing the communications between the UE and the base station; and communicate with the base station in accordance with the identified protection level.

22. The UE of claim 21, wherein a first protection level of the plurality of protection levels provides physical layer security to a physical uplink control channel and a second protection level of the plurality of protection levels provides physical layer security to the physical uplink control channel and a physical uplink shared channel.

23. The UE of claim 22, wherein the instructions are further executable by the processor to cause the UE to:

transmit, as the physical layer security, an interference signal overlapping in time with one or more first transmissions of the physical uplink control channel when the interference signal corresponds to the first protection level or overlapping in time with one or more second transmissions of the physical uplink control channel, the physical uplink shared channel, or both when the interference signal corresponds to the second protection level.

24. The UE of claim 21, wherein the instructions are further executable by the processor to cause the UE to:

receive a mapping of each protection level of the plurality of protection levels to a respective one or more channels, wherein the different degrees of physical layer security relate to a number of any type of channels to which the physical layer security is applied.

25. The UE of claim 24, wherein:

the one or more channels comprise an uplink control channel, a downlink shared channel, an uplink shared channel, a downlink control channel, or any combination thereof, and each channel of the one or more channels is associated with a different protection level of the plurality of protection levels.

26. The UE of claim 24, wherein:

a first protection level of the plurality of protection levels and a second protection level of the plurality of protection levels each map to a same channel.

27. The UE of claim 21, wherein the instructions are further executable by the processor to cause the UE to:

apply the identified protection level to the communications with the base station until the UE receives a second control message indicating to change to applying another protection level of the plurality of protection levels; and receive the second control message.

28. The UE of claim 21, wherein the instructions are further executable by the processor to cause the UE to:

transmit, during a duration overlapping with communicating with the base station, an interference signal based at least in part on receiving the indication of the identified protection level.

29. The UE of claim 21, wherein the instructions to receive the control message are executable by the processor to cause the UE to:

receive radio resource control (RRC) signaling including the identification of the plurality of protection levels.

30. A base station, comprising:

a processor;

memory coupled with the processor; and instructions stored in the memory and executable by the processor to cause the base station to:

transmit, to a user equipment (UE), a control message that includes an identification of a plurality of protection levels corresponding to different degrees of physical layer security for securing communications between the UE and the base station;
transmit, to the UE, an indication of an identified protection level of the plurality of protection levels to be used by the UE for securing the communications between the UE and the base station; and
communicate with the UE in accordance with the identified protection level.

* * * * *